United States Patent [19]

Hayakawa et al.

[11] Patent Number: 4,761,001
[45] Date of Patent: Aug. 2, 1988

[54] AUTOMATIC DOCUMENT FEEDER

[75] Inventors: Kimiaki Hayakawa, Yokohama; Hideaki Sayama; Makoto Kitahara, both of Tokyo; Takeshi Honjo, Kawasaki, all of Japan

[73] Assignee: Canon Kabushiki Kaisha, Tokyo, Japan

[21] Appl. No.: 753,029

[22] Filed: Jul. 8, 1985

[30] Foreign Application Priority Data

Jul. 10, 1984 [JP] Japan ................. 59-143474
Jul. 10, 1984 [JP] Japan ................. 59-143475

[51] Int. Cl.⁴ ............................................. B65H 5/22
[52] U.S. Cl. .................................. 271/3.1; 271/186; 271/902
[58] Field of Search ........... 271/3.1, 3, 186, 184, 271/185, 301, 902; 355/14 SH, 64, 3 SH

[56] References Cited

U.S. PATENT DOCUMENTS

| Re. 27,976 | 4/1974 | Sahley | 355/64 |
|---|---|---|---|
| 3,556,512 | 1/1971 | Fackler | 271/4 |
| 3,888,579 | 6/1975 | Rodek | 355/14 |
| 4,089,515 | 5/1978 | Stange | 271/3 |
| 4,099,150 | 7/1978 | Connin | 355/3 R |
| 4,140,387 | 2/1979 | Gustafson | 355/14 |
| 4,158,500 | 6/1979 | DiFrancesco | 355/14 |
| 4,169,674 | 10/1979 | Russel | 355/14 |
| 4,176,945 | 12/1979 | Holzhauser | 355/23 |
| 4,192,607 | 3/1980 | Hage | 355/50 |
| 4,234,180 | 11/1980 | Looney | 271/3.1 |
| 4,238,126 | 12/1980 | Langdon | 271/3.1 |
| 4,319,833 | 3/1982 | Hidding | 271/3.1 |
| 4,411,517 | 10/1983 | Gerken | 355/14 SH |
| 4,433,836 | 2/1984 | Kulpa | 271/3.1 |
| 4,456,237 | 6/1984 | Buddendeck | 271/3.1 |
| 4,544,148 | 10/1985 | Kitajima et al. | 271/186 |

FOREIGN PATENT DOCUMENTS 0078166 5/1983 European Pat. Off. .
113454 6/1984 Japan .
218464 12/1984 Japan .

Primary Examiner—H. Grant Skaggs
Assistant Examiner—Kenneth Noland
Attorney, Agent, or Firm—Fitzpatrick, Cella, Harper & Scinto

[57] ABSTRACT

An automatic feeder for feeding an original to be copied to a station for reading the original, includes an original supporting station for supporting an original to be copied, a first original passage for feeding the original from the original supporting station to the original reading station, a second original passage, communicatable with the reading station, for unidirectionally conveying the original away from the reading station, a third original passage communicatable with the second original passage, a fourth original passage, communicatable with the third original passage, for unidirectionally conveying the original away from the third original passage, a fifth original passage, communicatable with the fourth original passage, and a sixth original passage, communicatable with the fifth original passage, for unidirectionally conveying the original away from the fifth original passage to the original reading station.

26 Claims, 21 Drawing Sheets

AUTOMATIC DOCUMENT FEEDER

BACKGROUND OF THE INVENTION

The present invention relates to an automatic document or original feeder usable with image recording machines such as an electrophotographic copying machine, a laser beam printer, a facsimile machine or an ink jet printer. More particularly, the invention relates to an automatic document feeder capable of automatically feeding both sided originals to an image reading station for recording the images of both sides. Further, the invention also relates to an image recording apparatus provided with an automatic document feeder.

Various types of automatic document feeders for automatically feeding an original for duplex image recording are known.

For example, U.S. Pat. Nos. 4,099,150, 4,140,387 and 4,158,500 disclose the feeders of those types. In the devices disclosed therein, both sides of an original can be automatically fed to the image reading station, and the original, after being read, is returned to the original feeding station in the same page order as before the feeding to the reading station so that it is convenient for handling; however, the machines disclosed in U.S. Pat. Nos. 4,099,150 and 4,140,387 require an additional storing portion for stacking in addition to the pre-feeding stacking portion, resulting in bulkiness of the machine and a complicated control of the originals. U.S. Pat. No. 4,158,500 discloses a single stacking portion. However, the original is introduced to a platen of a reading station from one end and discharged from the other end, resulting in a complicated and bulky driving mechanism. Additionally, U.S. patent application Ser. No. 632,214 filed on July 18, 1984 assigned to the assignee of this application proposes an automatic document feeding device. The present invention is a further improvement of the apparatus of this type.

SUMMARY OF THE INVENTION

Accordingly, it is a principal object of the present invention to provide an automatic document feeder capable of automatically introducing both sides of an original to an image reading station.

It is another object of the present invention to provide an automatic document feeder wherein the originals, after being read, are returned to the original stacking portion for stacking the originals to be copied.

It is a further object of the present invention to provide an automatic document feeder wherein the originals, after being read, are returned to the original stacking portion in the same page order as before.

It is a further object of the present invention to provide an automatic document feeder wherein single sided originals are stacked face up so as to provide collated copies or prints.

It is a further object of the present invention to provide an automatic document feeder having a compact driving system.

It is a further object of the present invention to provide an automatic document feeder which can be mounted in a compact manner to an image recording apparatus such as an electrophotographic copying machine, a laser beam printer and an ink jet printer.

It is another object of the present invention to provide an image recording apparatus equipped with the automatic original feeder.

It is a further object of the present invention to provide a compact automatic document feeder.

It is a further object of the present invention to provide an automatic document feeder wherein the control of the original travel is simplified.

It is a further object of the present invention to provide an automatic document feeder wherein the originals travel in the same direction in the passageways so as to minimize occurrences of paper jam.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
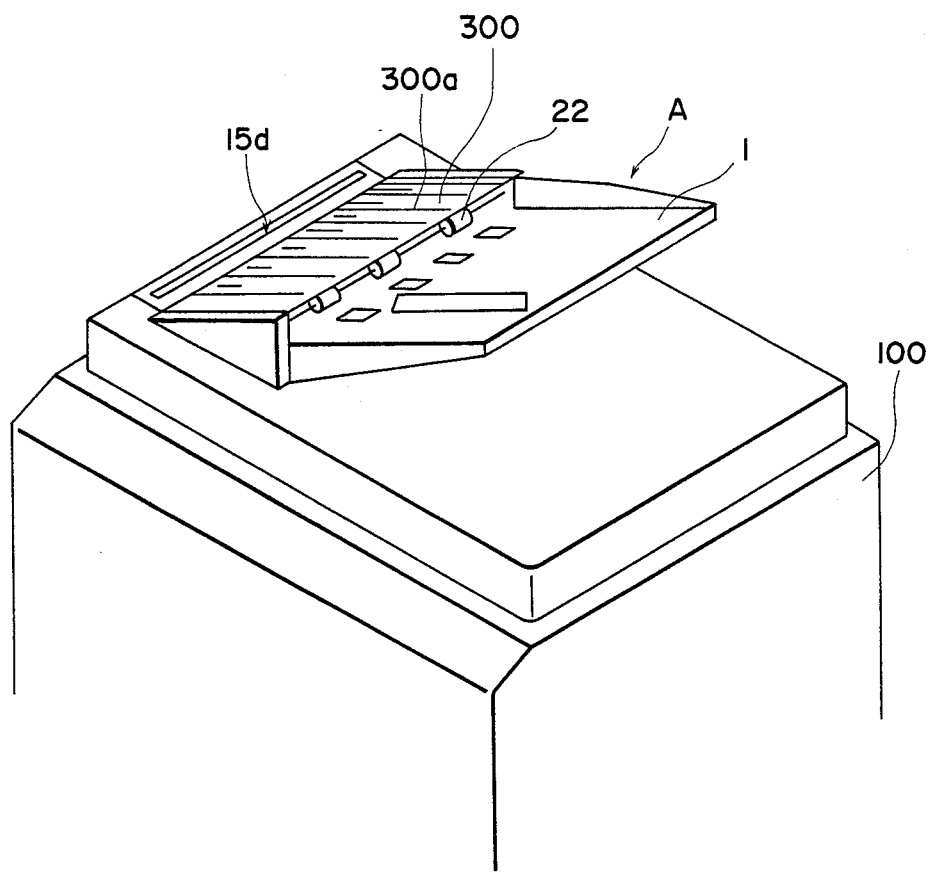
FIG. 1A is a perspective view of a part of an electrophotographic copying machine provided with an automatic document feeder according to an embodiment of the present invention.

The preferred embodiments of the present invention will be described in detail in conjunction with the accompanying drawings illustrating an exemplary electrophotographic copying machine.

The automatic document feeder in this embodiment is operable in a simplex-simplex copy mode, a simplex-duplex copy mode, a duplex-simplex copy mode or a duplex-duplex copy mode, which will be described in more detail hereinafter.

When the automatic document feeder of this embodiment is incorporated in a typical copying apparatus, simplex copies (single sided copies) can be automatically provided from duplex originals (double sided originals) as well as from simplex originals (single sided originals). When the automatic document feeder is incorporated in a duplex copying apparatus, duplex copies, or if necessary, simplex copies can be automatically provided from duplex originals.

In this embodiment, the original is placed face down on a platen glass when it is illuminated for an imagewise exposure. "Simplex original" or "simplex document" is an original or document having an image only on one side, that is, a single sided original. "Duplex original" or "duplex document" is an original or a document having an image on each side thereof, that is, double or both sided original or document. "Simplex copy" is a copy having an image only one side thereof, that is, a single sided copy, or a copying operation for providing the simplex copy. "Duplex copy" is a copy having an image on each side thereof, that is, a double sided copy, or a copying process for providing the duplex copy. Each of the modes will be described in more detail.

A. Simplex-Simplex Copy Mode

A simplex original is reproduced as a simplex copy. When the simplex originals are stacked face up on an original stack, the originals are inverted, that is, the face orientation is changed to the opposite. The inversion places the simplex original face down on a platen glass. The bottom face of the original is subjected to a copying operaton of the main assembly of the image forming apparatus, which will be hereinafter also called simply "main assembly". The originals are then inverted back to the initial state and discharged. Thus, the originals are returned to the original stack where they are stacked again face up, the same manner as before the feeding to the platen glass.

When the simplex originals are stacked face down on the original stack, the originals are fed without inversion and discharged without inversion.

B. Simplex-Duplex Copy Mode

Simplex originals are reproduced as duplex copies. The originals are fed and discharged in the same manner as described in Item A. A first simplex original is copied on a first side of a copy sheet, and then a second simplex original is copied on the opposite side of the same copy sheet so that a duplex copy is produced from two simplex originals.

C. Duplex-Simplex Copy Mode

A duplex original is reproduced as simplex copies. When duplex originals are stacked on the original stack in the page order, the originals are fed with an even number of inversions. By doing so, the final page of the duplex originals is placed face down on the platen glass, and the bottom face is subjected to the copying operations of the main assembly so as to form an image thereof on a first side of a first copy sheet, so that a simplex copy of the final page of the duplex original is produced.

Then, the original placed on the platen glass is inverted and fed again onto the platen glass, and therefore, the last but one page of the same duplex original is facedown on the platen glass. The bottom face of the duplex original is subjected to the copying operation of the main assembly to form a copy image on a first side of the next copy sheet, whereby a simplex copy is produced with respect to the last but one page of the first duplex original. The original is then inverted and discharged. Thus, the duplex originals are returned to the original stack in the same page order as before the feeding to the platen glass.

D. Duplex-Duplex Copy Mode

A duplex original is reproduced as a duplex copy. The feeding and discharging of the originals are the same as described in Item C. The first side and the second side of a duplex original are reproduced on the first side and the second side of the same copy sheet, respectively, by the copying process of the main assembly so that duplex copies are provided from duplex originals.

By using the automatic document feeder according to the embodiment of the present invention, the image forming process can be automatically performed in the above-described various modes to facilitate the copying operations.

Before describing in detail the automatic document feeder A, a duplex electrophotographic copying apparatus 100 will be described.

The duplex copying apparatus comprises a platen glass 10, a photosensitive drum 330 rotatable about a shaft 330a in the direction shown by an arrow, a charger 331, a developing device 332, a transfer charger 333, a cleaning device 334, a cassette 335 for storing the copy materials such as copy sheets, a feeding roller 336 for feeding one by one copy sheets in the cassette 335, register rollers 337 and 337a, and a conveyer belt 338 for conveying the copy sheet to a fixing device having rollers 339 and 339a after the image is transferred onto the copy sheet. The apparatus further comprises an interim tray 340 for tentatively depositing a simplex copy, a driving shaft 341 and a driven shaft 341a of a feeding belt 342, a driving shaft 343 and a driven shaft 343a of a separating belt 344 to re-feed the simplex copy sheets deposited on the interim tray 340 from the bottom. The apparatus further includes discharging rollers 345 and 345a for discharging the copy sheets after completion of the copying operation to a tray T, or to proper bins of a sorter not shown, if the copying apparatus is equipped with a sorter.

The movement of a copy sheet will be described. First, the description will be made as to the case where simplex copies are produced. A copy sheet is fed out of the cassette 335 by a feeding or pick-up roller 336 and then fed to a transfer station F so as to be aligned with the formed image on the photosensitive drum 330 by the register rollers 337 and 337a. In the transfer station, the image on the photosensitive drum 330 is transferred onto the copy sheet. The copy sheet having received the image is conveyed along the sheet passageway IIb on the conveyer belt 338 to the fixing device having the rollers 339 and 339a where the image is fixed on the copy sheet. Thereafter, the copy sheet is discharged to the tray T by the discharging rollers 345 and 345a along the passageway VIIIb.

In the case of duplex copy, a guide 348 provided downstream of the fixing device is shifted to the state shown by broken lines so that the copy sheet having an image only on one side is introduced to a passageway IIIb after having passed through the fixing device. The copy sheet is inverted by passing along the passageway IIIb and then stored on an interim tray 340. Next, the copy sheet on the interim tray 340 is separated by the rotation of the belts 342 and 344 and fed out one by one from the tray 340 to a passageway VIb. The copy sheet fed to the passageway VIb is conveyed to the transfer station F into alignment with the image on the photosensitive drum 330 by the same register rollers 337 and 337a. In the transfer station, the image formed on the photosensitive drum 330 is transferred onto the second side of the copy sheet. The copy sheet then passes along the passageway IIb, and the image on the second side is fixed so that the copies are formed on the both sides of the copy sheet, and the copy sheet is discharged to the tray T. Along the passageway IIIb, there are provided couples of rollers 350a, 350b, 350c and 350d to properly convey the copy sheet and a couple of rollers 350e for discharging the copy sheet to the interim tray 340.

Figure 1B:
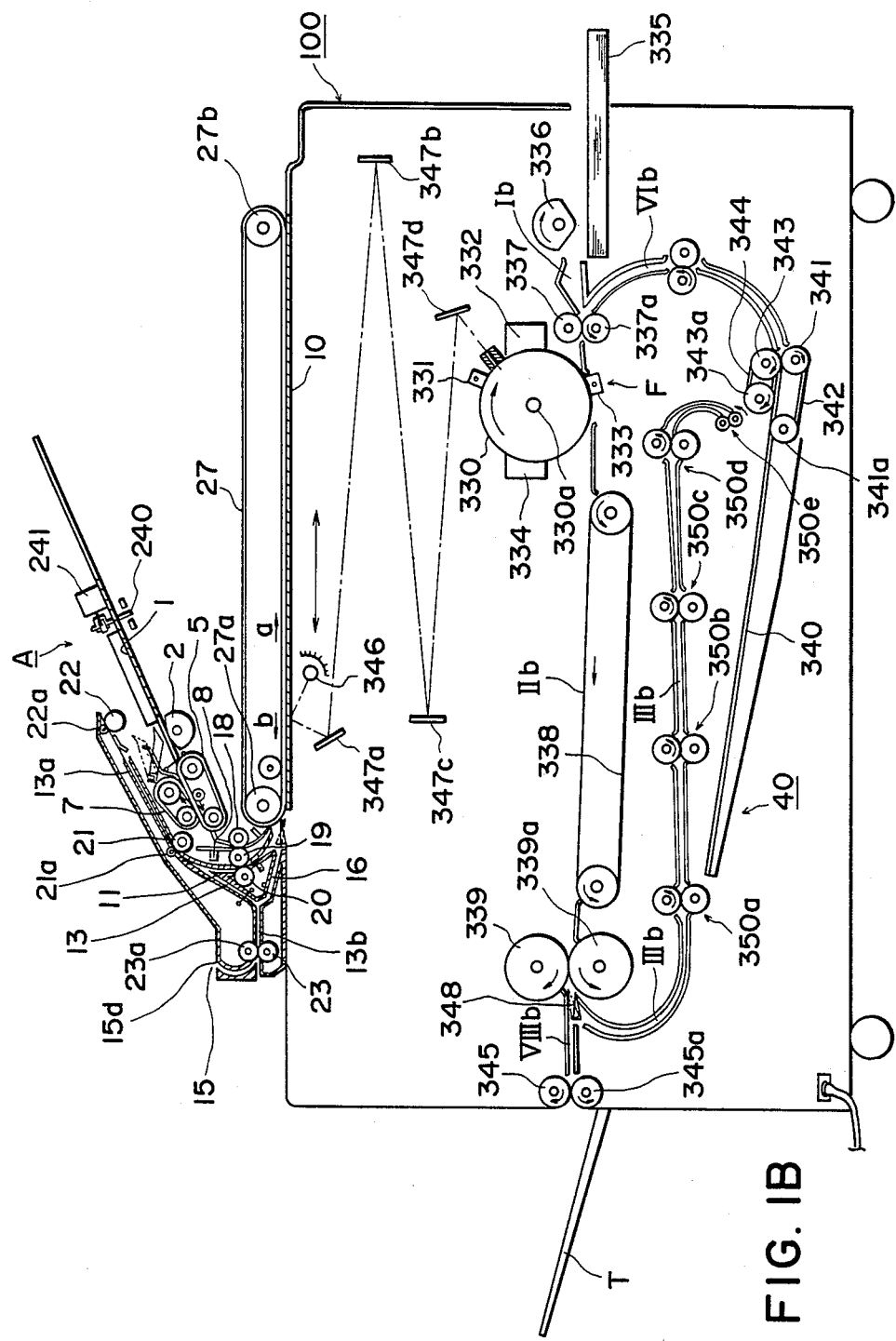
FIG. 1B is a sectional view of the apparatus of FIG. 1.
Figure 2:
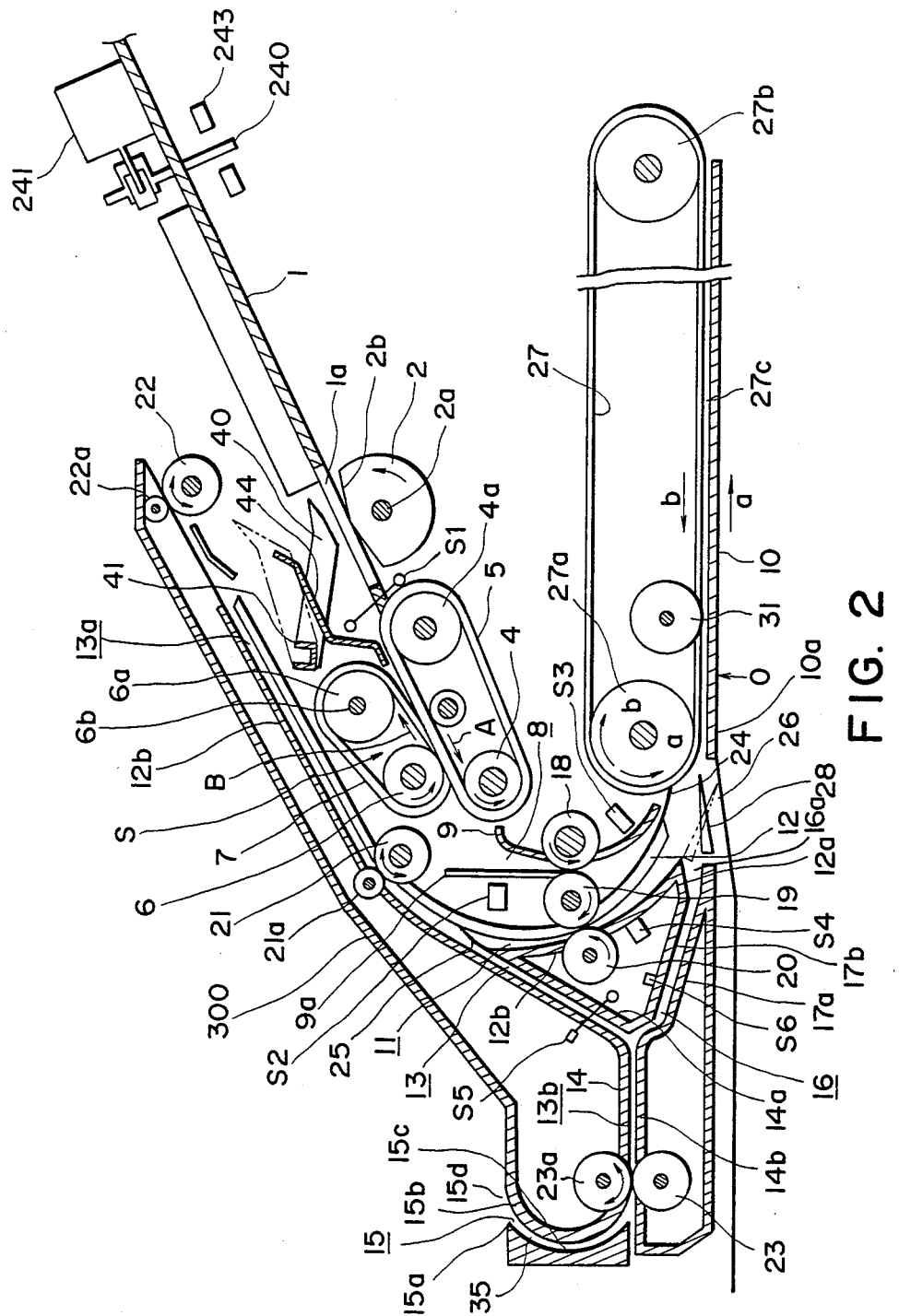
FIG. 2 is an enlarged sectional view of the automatic document feeder thereof.

Referring to FIGS. 1A, 1B and 2, the automatic document feeder A will be described. The document feeder A includes a stacking tray 1 for stacking thereon the originals or documents to be copied. The stacking tray 1 is so inclined that the original outlet side is relatively lower so that the stacked originals are urged by the gravity to the outlet side and aligned properly. The document feeder further includes a crescent roller 2 for feeding the original to a downstream separator. The crescent roller 2 is controlled so that when there is no original on the stacking tray 1, the cut-away portion 2b is substantially faceup. Feeding rollers 4 and 4a rotate so as to travel the feeding belt 5 in the direction shown by an arrow A, thereby feeding the original stacked on the tray 1. Separating rollers 6 and 6a are effective to rotate a separation belt 7 in the direction shown by an arrow B. The separation belt 7 is cooperative with the feeding belt 5 to single out the bottommost original of the originals stacked on the stacking tray 1. Thus, the feeding belt 5 and the separating belt 7 constitute a separator-feeder mechanism S.

A first sheet passageway 8 is formed between guiding plates 9 and 9a and is effective to guide the original singled out by the separator-feeder S onto the platen glass 10 of the main assembly of the copying apparatus. The sheet passageway 8 arcuately extends between the separator-feeder S and an end 10a of the platen glass 10. Therefore, the original fed out by the feeding belt 5 is inverted and then fed onto the platen glass 10.

A second sheet passageway 11 is formed between arcuated guides 12 and 12a and is effective to receive the original from the platen glass 10 and invert the original and direct the same to the stacking tray 1. The second sheet passageway 11 extends arcuately outside the arcuation of the first sheet passageway 8 as shown in the Figures. The second passageway 11 extends from an end 10a of the platen glass 10 to above the separation belt 7 by way of a portion outside the first passageway 8.

A third sheet passageway 13 branches out of the second sheet passageway 11 in the switch-back direction, that is, in the manner that the original in the second passageway 11 is introduced into the third passageway 13 by switching the direction of movement thereof. The passageway 13 is formed by guiding plates 14 and 14a and by the guiding plates 14 and 14b.

A fourth sheet passageway 15 communicates with the third passageway 13 at an end thereof away from the second passageway 11 and is formed by arcuated guiding plates 15a and 15b. The fourth passageway 15 is adapted to receive the original moving along the third passageway 13 away from the second passageway 11 and deflects the original by the arcuated portion 15c of the guide 15a so as to expose a part of the original outwardly. By this, the original is partly exposed outside so that the face of the original which is about to be copied is faceup. This allows the operator to check which face of the original is going to be copied.

A fifth sheet passageway 16 branches out of the third sheet passageway 13 and extends toward passageway 16a which extends toward the end 10a of the platen glass 10. This passageway 16 cooperate with the second passageway 11 and the third passageway 13 to invert the duplex original. The fifth passageway 15 is formed by guides 17a and 17b and is effective to receive the original which is conveyed along the third sheet passageway 13 to the fourth passageway 15 and then switched back, so as to direct such an original onto the platen 10. The sixth passageway 16a is formed by guide 12 and moveable deflector 26.

Figure 3A:
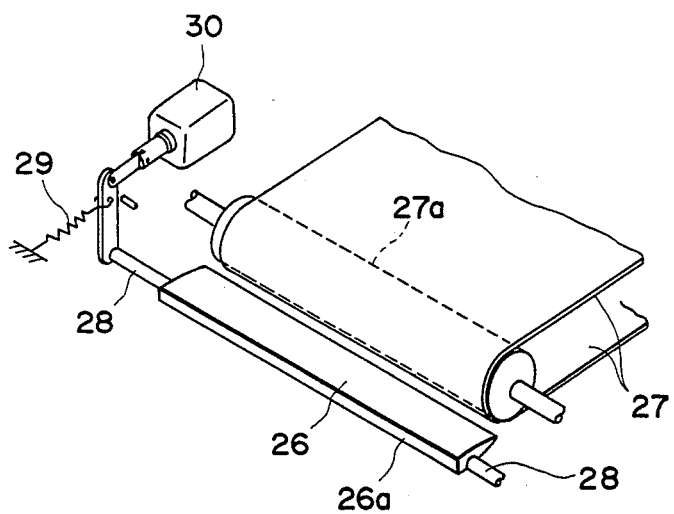
FIG. 3A is a perspective view of a movable deflector.
Figure 3B:
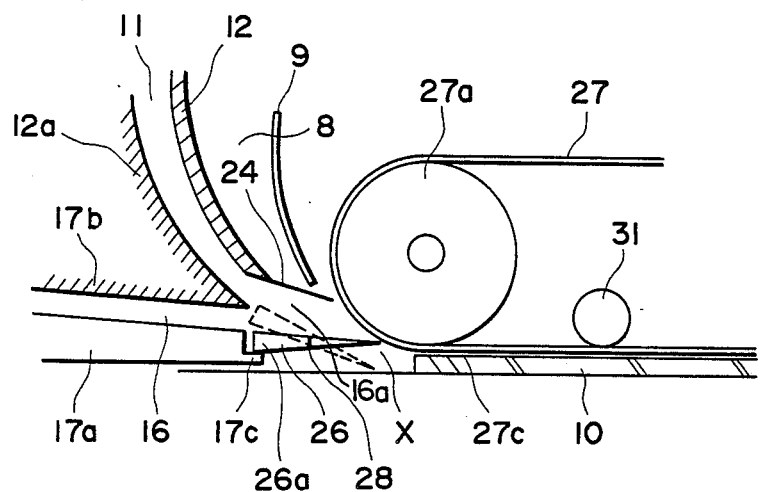
FIG. 3B is a side view of the same deflector.

Rollers 18, 19 and 20 convey the original sheets. The nip formed between the rollers 18 and 19 is effective to convey the original along the first sheet passageway 8 toward the platen glass 10, while the nip formed between the rollers 19 and 20 is effective to convey the original along the second sheet passageway 11 to the stacking tray 1. A couple of feeding rollers 21 and 21a and a couple of feeding rollers 22 and 22a cooperate to feed the original from the platen glass 10 side to the stacking tray 1 side, and then feed back the original from the second sheet passageway 11 to the third sheet passageway 13. A couple of feeding rollers 23 and 23a reverses the original coming from the third sheet passageway 13 and convey the same away from the third passageway 13 to expose partly the original outwardly. Then, a couple of rollers 23 and 23a reverses to feed the original back to the fifth passageway 16 through a portion 13b of the third sheet passageway 13. A flexible deflector 24 has an end fixed onto the guide 12 and the opposite end disposed contacted or slightly spaced from the original feeding belt 27. Thus, the leading edge of the original travelling along the first sheet passageway 8 pushes the flexible deflector 24 to pass toward the platen 10. On the other hand, the original coming from the platen 10 toward the second sheet passageway 11 is positively directed to that sheet passageway since the edge of the deflector 24 is contacted or is close to the belt 27. When this occurs, a movable deflector 26 which will be described in detail hereinafter takes the position depicted by broken lines to also direct the original to the second sheet passageway 11. There is provided another flexible deflector 25 having an end fixed on the guide 14a and the opposite end in contact with the guide 12. The leading edge of the original passing along the sheet passageway 11 pushes this deflector 25 away to pass through. On the contrary, the original switched back from the second sheet passageway 11 toward the third sheet passageway 13 is positively directed to the third passageway 13 since the edge of the deflector 25 is press-contacted to the guide 12. FIGS. 3A and 3B will also be referred to. The above-mentioned movable deflector 26 is disposed at a merging portion, adjacent to the lefthand end of the platen 10 in FIG. 2, among the first sheet passageway 8, the second sheet passageway 11 and the fifth sheet passageway 16. The movable deflector 26 extends parallel to the driving roller 27a for the belt 27 and is swingable about a shaft 28 provided adjacent each end thereof. The deflector 26 is urged upwardly by a spring 29, and a lateral end 26a abuts a stopper portion 17c of the guide 17a. The movable deflector 26 swings downwardly to the position indicated by the broken lines when a plunger operatively coupled to the shaft 28 is energized. Upon taking the broken line position, the original which is retracting from the platen 10 after being fed from the sheet passageway 8 to the paten 10, is positively directed to the second sheet passageway 11. When the solid line position is taken, the original is positively directed to the platen 10 from the fifth sheet passageway 16. The deflectors 24 and 25 are of sheets of a flexible material, such as Mylar and stainless steel sheet. The original feeding rollers 27a and 27b are reversible and rotate the original feeding belt 27 in the opposite directions. The belt 27 has sufficient width to cover substantially the entire width of the platen glass 10. Upon the forward rotation thereof, the original is directed to the platen 10, while upon the opposite rotation, the original thereon is discharged from the platen 10. In this embodiment, the roller 27a is a driving roller, and the roller 27b is a driven roller.

A roller 31 is provided to confine the belt 27 so as to urge the belt 27 onto the surface of the platen glass 10. This is effective to ensure the transportation of the original and is effective to provide a sharp image by ensuring the close contact of the original to the platen glass 10.

Next, description will be made with respect to various sensors.

A first sheet sensor S1 is of a transparent type and is disposed at a leading side of the original stacking tray 1. The first sheet sensor S1 detects the presence and absence of the sheet on the tray 1. A second sheet sensor S2 is disposed in the first sheet passageway 8 between the separator-feeder S and the couple of feeding rollers 18 and 19. A third sheet sensor S3 is disposed between the couple of feeding rollers 18 and 19 and the inlet end 10a of the platen glass 10. A fourth sheet sensor S4 is disposed in the second sheet passageway 11 between the inlet end 10a of the platen glass 10 and the couple of feeding rollers 19 and 20. A fifth sheet sensor S5 is disposed in such a part of the third sheet passageway 13 that is formed by the guides 14 and 14a. Further, a sixth sheet sensor S6 is disposed in the fifth sheet passageway 16 between the couple of feeding rollers 23 and 23a and the inlet end 10a of the platen glass 10. The second, third, fourth, fifth and sixth sheet sensors S2, S3, S4, S5 and S6 detect the leading and trailing edges of the sheet original.

Figure 4:
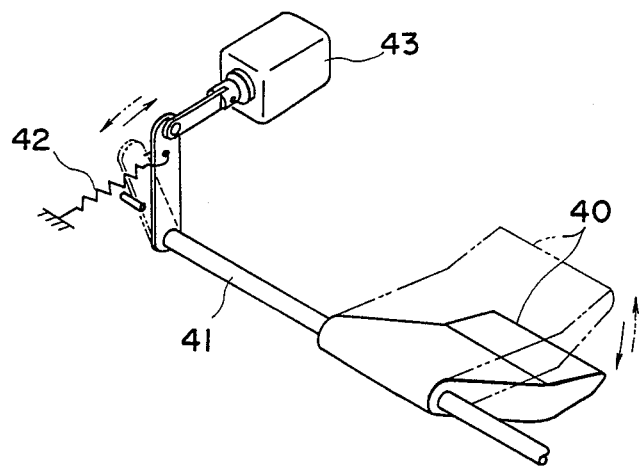
FIG. 4 is a perspective view of a weight member.

A weight member 40 is provided above a through opening 1a of the original stacking tray 1 and is swingable about a shaft 41. The weight member 40 is normally urged by a spring 42 (FIG. 4) to a position shown by the broken lines (FIG. 2), that is, the position not interfering with the originals on the stacking tray 1. When a plunger 43 is energized, the weight member 40 swings down against the spring force of the spring 42 to be brought into contact with the top surface of the stacked originals opposed to the crescent roller 2, so as to press the originals with the proper pressure. Because of the load on the originals applied by the weight member 40, a stabilized and positive original feeding by the crescent roller 2 is provided for the bottommost original of the stacked originals on the tray 1 to the separator-feeder mechanism S.

Figure 5:
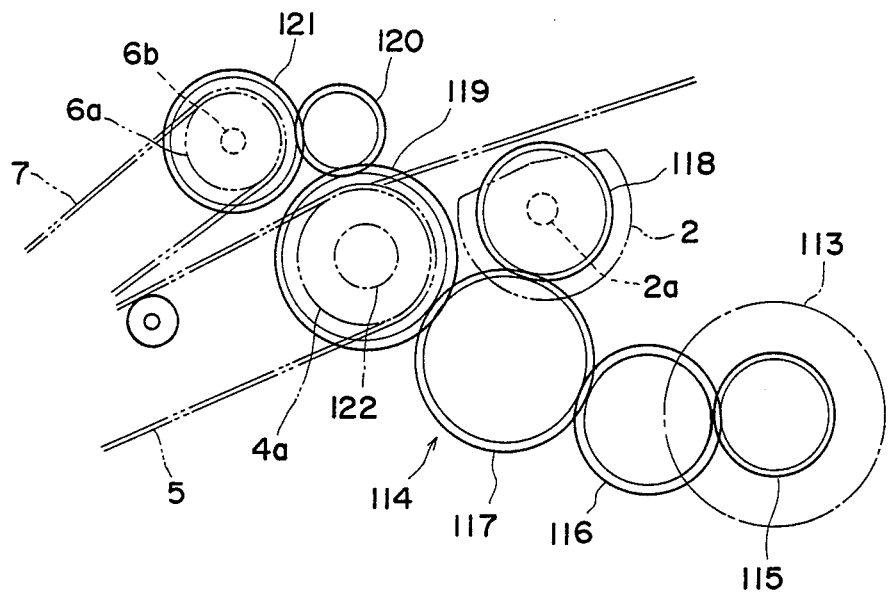
FIG. 5 illustrates a separating mechanism.

The operation of the separator-feeder S will be described in conjunction with FIG. 5 illustrating the driving mechanism for the separator-feeder S including a gear train 114.

A gear 115 fixed to an output shaft of a driving motor 113 is operably coupled to a gear 117 by way of an intermediate gear 116. The gear 117 is meshed with a gear 118 fixed to a shaft 2a of the crescent roller 2 and with a gear 119 for driving a driving pulley 4a of the feeding belt 5. The gear 119 is coupled through an intermediate gear 120 to a gear 121 fixed to a shaft 6b of a driving pulley 6a of the separation belt 7. Between the gear 119 and the driving pulley 4a for the feeding belt 5, a known one-way clutch 122 is provided to allow an over-feeding in the forward (counterclockwise) direction.

The driving mechanisms for the belt 27 and feeding rollers will be described with reference to FIGS. 6 and 7.

Figure 6:
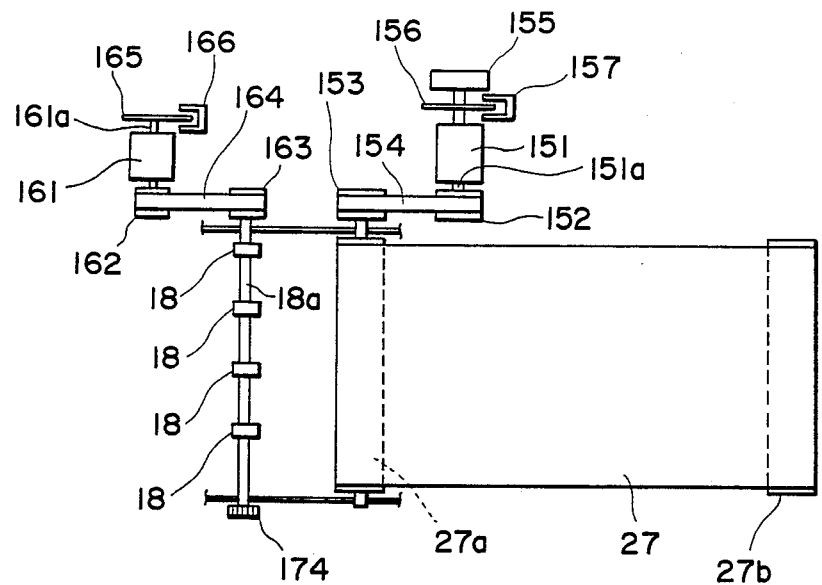
FIG. 6 is a top plan view of a major driving mechanism.

FIG. 6 is a top plan view of a major driving mechanism. A motor 151 for driving the belt 27 is a reversible motor. The motor 151 has an output shaft 151a to which a motor pulley 152 is securely fixed. The roller 27a for driving the belt 27 has a driving pulley 153 fixed thereto, wherein a timing belt 154 is trained over the pulleys 152 and 153. The shaft 151a of the motor 151 is provided with an electromagnetic brake 155 with the view to improving the accuracy of original stop position. In order to detect the rotation of the motor 151, the motor shaft 151a has a clock disk 156 mounted thereto, which is cooperable with a photointerruptor 157, which is located at the opposite side from the belt 27 as seen from FIG. 5.

A motor 161 is a feed driving motor which is reversible. To the output shaft of the motor 161, a motor pulley 162 is securely fixed. Correspondingly, a pulley 163 is securely fixed to the shaft 18a of the feeding roller 18, wherein a timing belt 164 is trained over the pulleys 162 and 163. In order to detect the rotation of the motor 161, the shaft of the motor 161 is provided with a clock disk 165 fixed to the shaft 161a thereof, which is cooperable with a photointerruptor 166, which are located at the opposite side from the belt 27 as shown in FIG. 6.

Figure 7:
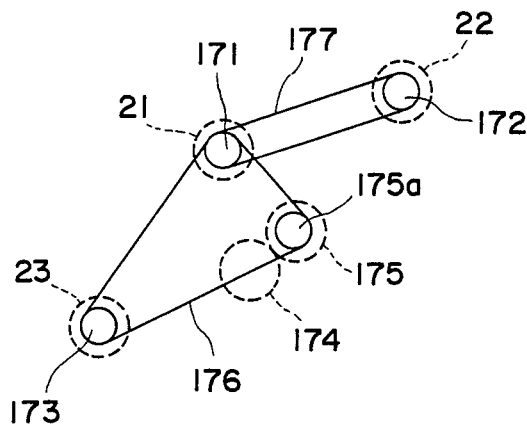
FIG. 7 is a front view of another major driving mechanism.

FIG. 7 is a front view of the major driving mechanism for the feed drive. As shown, pulleys 171, 172 and 173 are fixed to the feeding rollers 21, 22 and 23, respectively at the opposite side from the belt 27. Further, to the feeding roller 18, a gear 174 is fixed at the same side. The gear 174 is meshed with a gear 175, to which a pulley 175a is mounted. A timing belt 176 is trained over the pulleys 171, 173 and 175a, and a timing belt 177 is trained between the pulley 171 and the pulley 172. With this mechanism, the rotation of the driving motor 161 is transmitted to each of the feeding rollers 18, 21, 22 and 23. Since the feeding roller 19 is press-contacted to the roller 18, it is driven thereby. Similarly, the roller 20 is press-contacted to the roller 19 so as to be driven by the roller 19.

Figure 8:
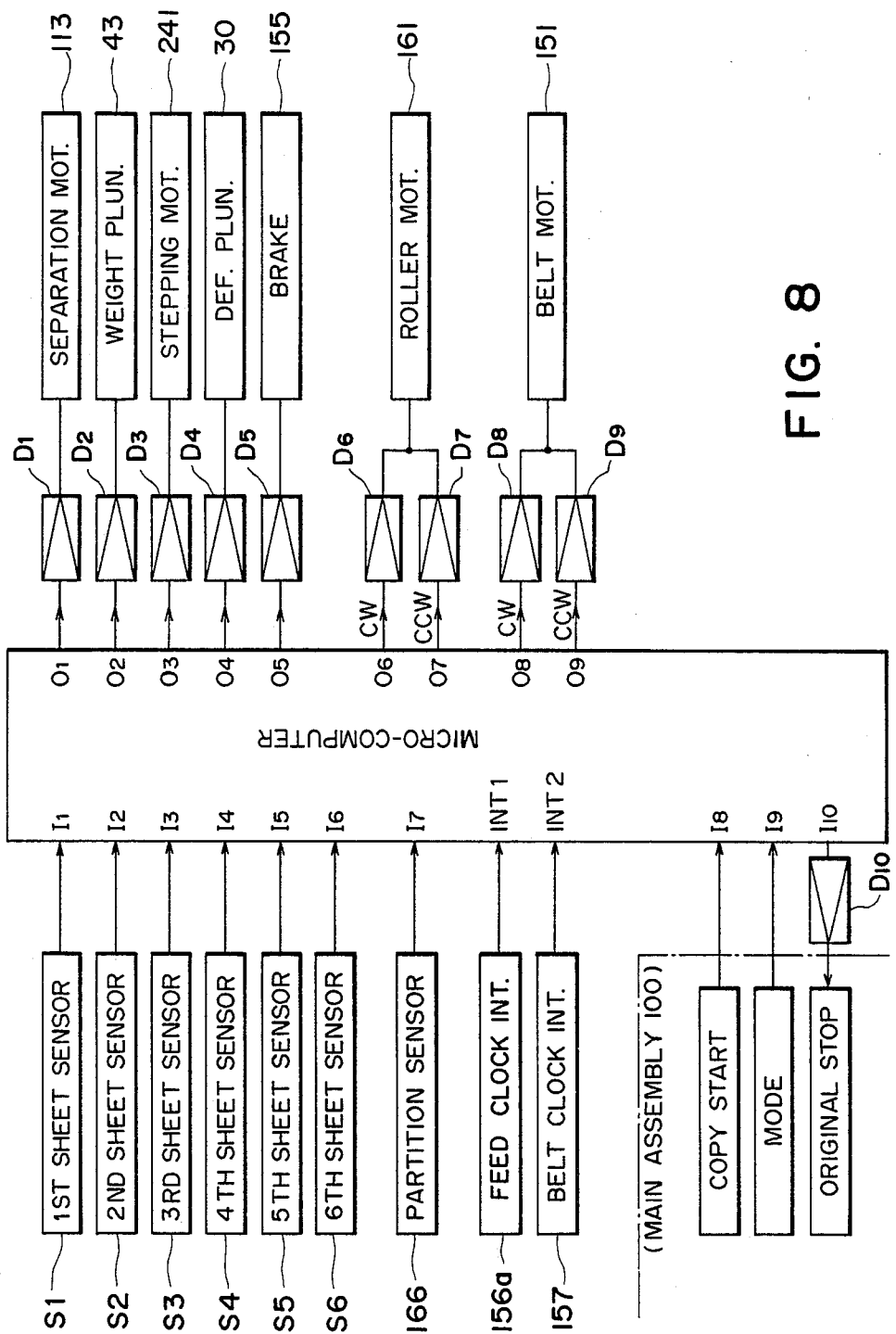
FIG. 8 is a block diagram of a control circuit.

FIG. 8 is a block diagram illustrating the general arrangement of the control circuits for sequential control of the feeder according to one embodiment. The control system contains ROM (read only memory) and RAM (random access memory) and others, and is constituted with the major component of a known one chip microcomputer. The control system is communicatable with the controller for the main assembly 100 of the copying machine.

The input ports I1–I8 can receive signals from the sheet sensors S1–S6 disposed along various passageways for the originals as described hereinbefore, signals from a partition plate sensor 166 for detecting a particular state of a partition plate which will be described hereinafter, copy start signals which are given from the main assembly 100 and are effective to initiate the operation of the document feeder and mode signals for designating the mode of operation, simplex original mode or duplex original mode in which the document feeder is to operate. Interrupt ports INT1 and INT2 of the microcomputer can receive signals from a feed clock interruptor 156a for detecting the rotation of the motor 151 with the aid of the clock disk 156 fixed to the motor shaft 151a and can receive signals from the belt clock interruptor 157, so as to provide reference clock signals for the paper feed, which will be described in detail hereinafter. Those signals are counted by a counter provided in the microcomputer. Output ports O1–O10 of the microcomputer produce actuating signals to the above-described separation drive motor 113, the weight plunger 43, a stepping motor 241 for driving the partition plate which will be described hereinafter, the above described the plunger 30 for the movable deflector and the electromagnetic brake 155; CW and CCW signals for rotating forwardly and backwardly the feed drive motor 161; CW and CCW signals for rotating forwardly and backwardly the drive motor 151 for the belt 27; and stop signals for instructing the image exposure start at the time when the original is placed at the predetermined position on the platen glass 10 of the main assembly 100. Those signals actuate or deactuate the respective elements through drivers D1–D10, respectively.

The microcomputer contains a program stored in the ROM which controls the reading of the above-described input signals and the actuation and deactuation of the elements.

FIGS. 9–15 show the flow charts of the program for executing the automatic document feeding operation.

Figure 16:
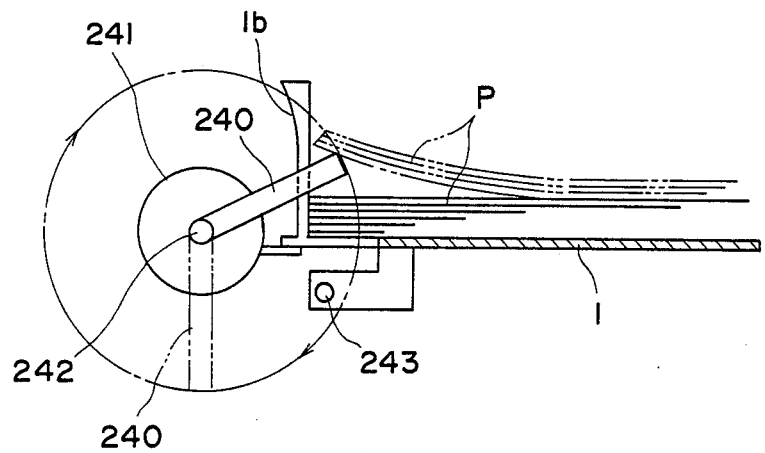
Figure 17:
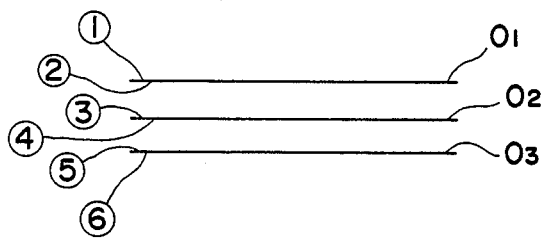

FIGS. 16–18 illustrate the operation of the feeder.

Now, the operation of the document feeder will be described in conjunction with those Figures.

A. SIMPLEX ORIGINALS a. The description will be made with respect to an exemplary case wherein N sets of simplex or duplex copies are taken from one set of simplex originals O1–O6 containing six pages as indicated by encircled numbers 1–6 in FIG. 15.

Figure 9:
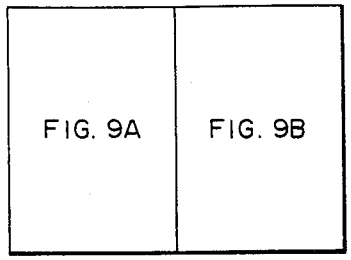
FIGS. 9-14 are flow charts illustrating the control sequences.
Figure 9B:
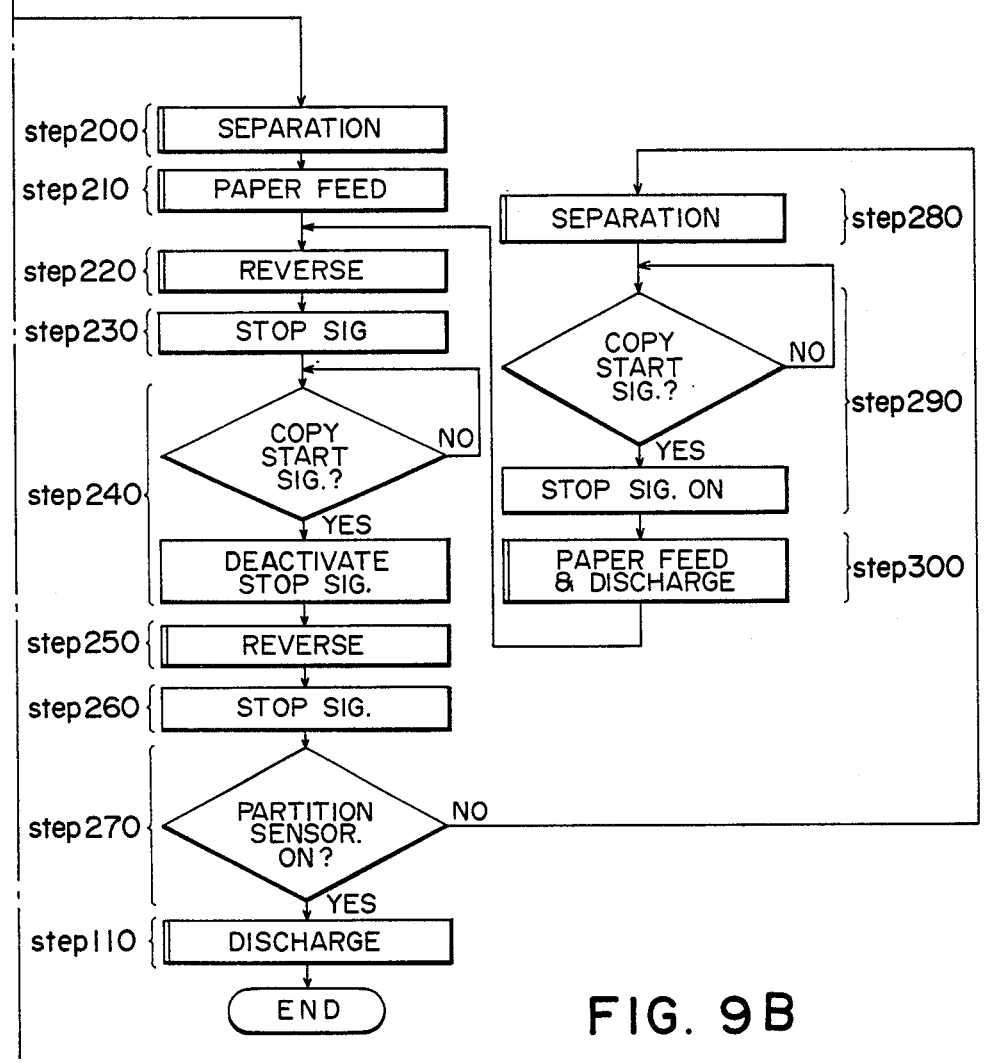
Figure 9A:
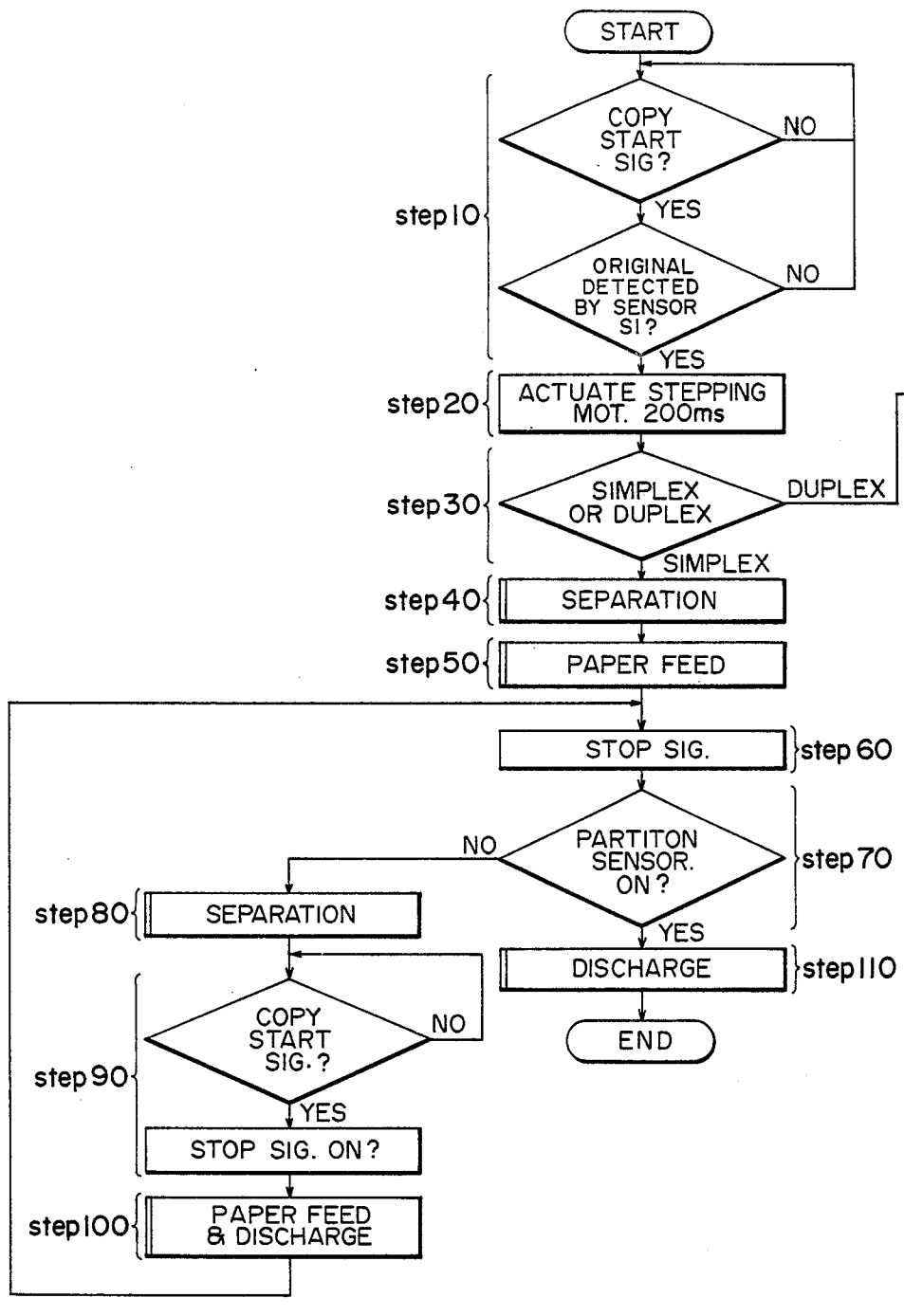
Figure 10:
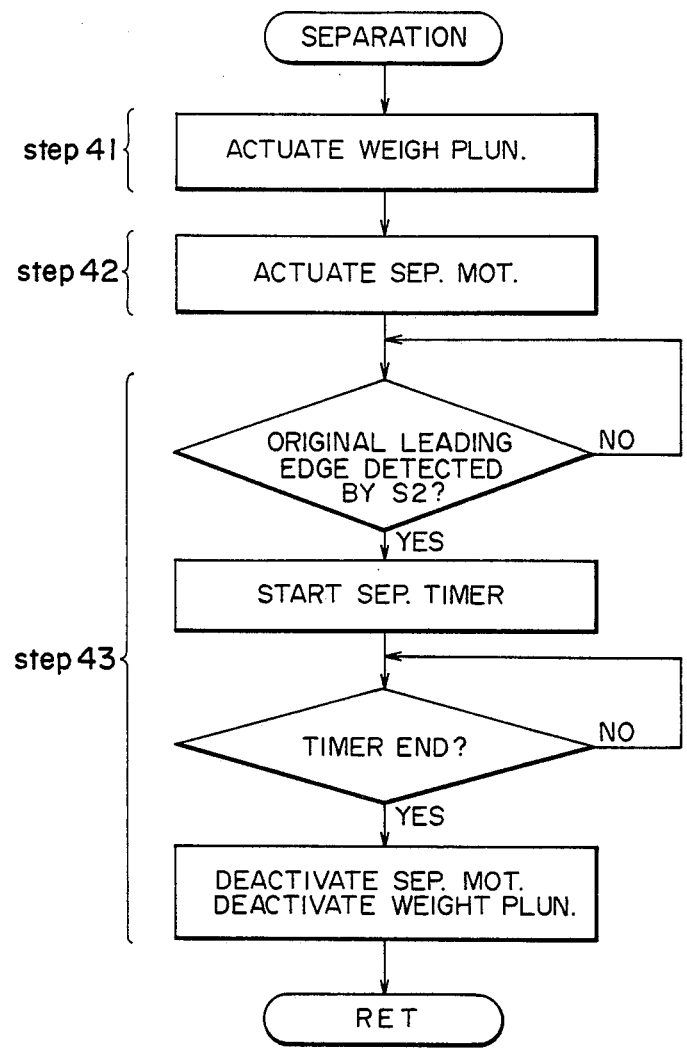
Figure 15:
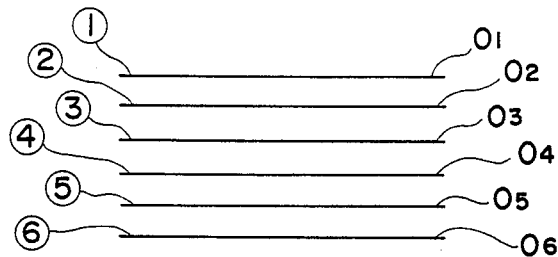
FIGS. 15-17 illustrate the operation of the automatic document feeder according to the present invention in the exemplary cases.

The six originals are stacked faceup in the page order with the first page topmost, the stack of the originals O1–O6 is placed on the original stacking tray 1 and is inserted between the tray 1 and the weight member 40 to a sufficient extent such that the leading edges of the originals abut the surface of the regulating plate 44. Then, the sensor S1 detects the presence of the originals.

b. The operator sets on an operating panel (not shown) the nature of the originals, that is, the simplex originals, the number N of copies to be made and the copy mode, that is, the simplex copy mode or duplex copy mode, and the other copying conditions if necessary. Then, the operator depresses a copy start button. In this embodiment, the designation of the simplex copy mode is outputted.

c. As shown in FIG. 9, at step 10, since the copy start signal is produced, and the sheet sensor S1 detects the presence of the original, the partition plate 240 is actuated to be placed on the topmost of the original on the stacking tray 1 as shown in FIG. 15. As will be described hereinafter, the partition plate 240 serves to distinguish the uncopied originals remaining on the stacking tray 1 as shown by solid lines in FIG. 16 and the copied originals which have been subjected to the copying operation and then returned to the stacking tray 1 as shown by chain lines in FIG. 16. The partition plate 240 is mounted to and driven by an output shaft 242 of a stepping motor 241 disposed outside the rear side wall 1b of the stacking tray 1. The partition plate 240 normally dangles as shown by chain lines in FIG. 16. The copy start signal at step 20, causes the output shaft 242 of the stepping motor 241 to rotate in the clockwise direction for 200 ms so that the partition plate 240 bears on the topmost original as shown by solid lines in FIG. 16. The partition plate 240 moves down with the stacked originals are sequentially fed out from the bottom thereof, and when the last original is fed out, it can not bear on anything so as to fall and dangle again as shown by the chain lines in FIG. 16. When it dangles, it is placed across the optical path for a photoelectric sensor 243, and therefore, it is detected that all of the originals have been fed out for a first set of copy.

c-1. Since the simplex copy mode is selected in the main assembly in this example, the program discriminates this at step 30 and proceeds to the sequences for the simplex copy mode.

d. The sequence goes to the next step, that is, step 40 to execute the separating operation. As shown in FIG. 10, at step 41 the plunger (FIG. 4) is energized to lower the weight member 40 so as to confine the stacked sheet originals.

e. Then, at step 42, the separation drive motor 113 is actuated, whereupon the crescent roller 2 and the separator-feeder mechanism S starts to operate. The bottommost of the sheet originals on the stacking tray 1, that is, the sixth page of the original O6 (FIG. 15) is separated from the stack of originals and is fed into the first sheet passageway 8.

f. At step 43, the sixth original O6 introduced into the first sheet passageway 8 passes by the second sheet sensor S2, and the leading edge thereof is detected thereby. The leading edge then abuts the nip of the couple of the rollers 18 and 19 which are at that time not rotating, so that the original is stopped there. The couple of rollers 18 and 19 starts to rotate forwardly when a predetermined separation time period elapses from the time when the second sheet sensor S2 detects the leading edge of the original. Before the time period passes, an amount of curling of the original is formed between the separator-feeder mechanisms and the couple of rollers 18 and 19, and then the operations of the crescent roller 2 and the separator-feeder mechanism S are stopped. In addition, the plunger 43 is deenergized to lift the weight member 40 so that it is brought from above the stack of originals and is held in that place. Thus, the separating operation is completed.

g. Subsequently at step 50 in FIG. 9, the paper feeding operation is executed. At step 51 in FIG. 11, the couple of feeding rollers 18 and 19 start rotating, the original O6 is further conveyed into the first sheet passageway 8 by the couple of rollers despite the non-operation of the crescent roller 2 and the mechanism S.

h. At step 52, the leading edge of the original O6 is detected by the third sheet sensor S3, in response to which the belt 27 starts rotating forwardly. The leading edge pushes the flexible deflector 24 away to reach the lefthand end 10a of the platen glass 10, where the original passes through the clearance X (FIG. 3B) between the whole surface belt 27 and the edge of the movable deflector 26 taking the chain line position. Then, the leading edge of the original is gripped between the bottom surface 27c of the whole surface belt 27 rotating forwardly and the top surface of the platen glass 10 with the image bearing side facing down, and the original 10 is driven rightwardly by the transporting force of the belt 27 along the surface of the platen glass 10.

i. At step 53, the trailing edge of the original O6 is detected by the third sheet sensor S3, and when a predetermined number of counts is counted by a registration counter therefrom, the belt 27 is stopped, and the electromagnetic brake 155 is energized for 100 ms. At this time of the drive stop, the trailing edge of the original O6 on the platen glass 10 is at a predetermined reference position O (FIG. 2). Then, the plunger 30 is energized to rotate the movable deflector 26.

The forward drive of the couple of feeding rollers 18 and 19 is stopped after the trailing edge of the original O6 is detected by the third sheet sensor S2. The original feeding to the platen 10 is completed in this manner.

j. At step 60 in FIG. 9, the copy start signal is reset by the main assembly of the copying apparatus in response to the signal representative of the stoppage of the belt 27. The optical system of the main assembly 100 starts its operation to read the image of the original O6 on the bottom surface thereof, and the image-wise exposure and copying process are executed. When the simplex copy mode has been selected (Item b), the image of the original O6 is formed on the first surface of the copy sheet, and the copy sheet is discharged to the copy tray T (FIG. 1B) with the image bearing side facing up. When the selected mode is the duplex mode, the copy sheet is not discharged to the copy tray T, but it is stored to the re-feeding mechanism 40.

j-1. During the imagewise process of the main assembly 100, the sequence goes to step 70 (FIG. 9), where the discrimination is made as to whether or not all of the originals have been fed out for the first complete set of copies by discriminating whether or not the partition plate 240 dangles to actuate the partition plate sensor 166. In this example only the first original has been discharged, the sequence goes to step 80.

j-2. At step 80, the above-described separating operation at step 40 is executed so that the next original, that is, the original O5 is fed until the leading edge of the original O5 abuts the nip between the rollers 18 and 19, and the predetermined amount of the curl of the original is formed. Thus, the orignal O5 is waiting for the subsequent feeding operation which will be described hereinafter.

j-3. At step 90, a copy start signal is regenerated upon completion of the image exposure process with respect to the original O6. In response to this, the stop signal is reset, and the sequence proceeds to step 100.

k. At step 100, the feed-discharge operation, that is, the original exchanging operation is performed wherein the previous original O6 is discharged and the next original O5 is taken up simultaneously.

Figures 12, 12B:
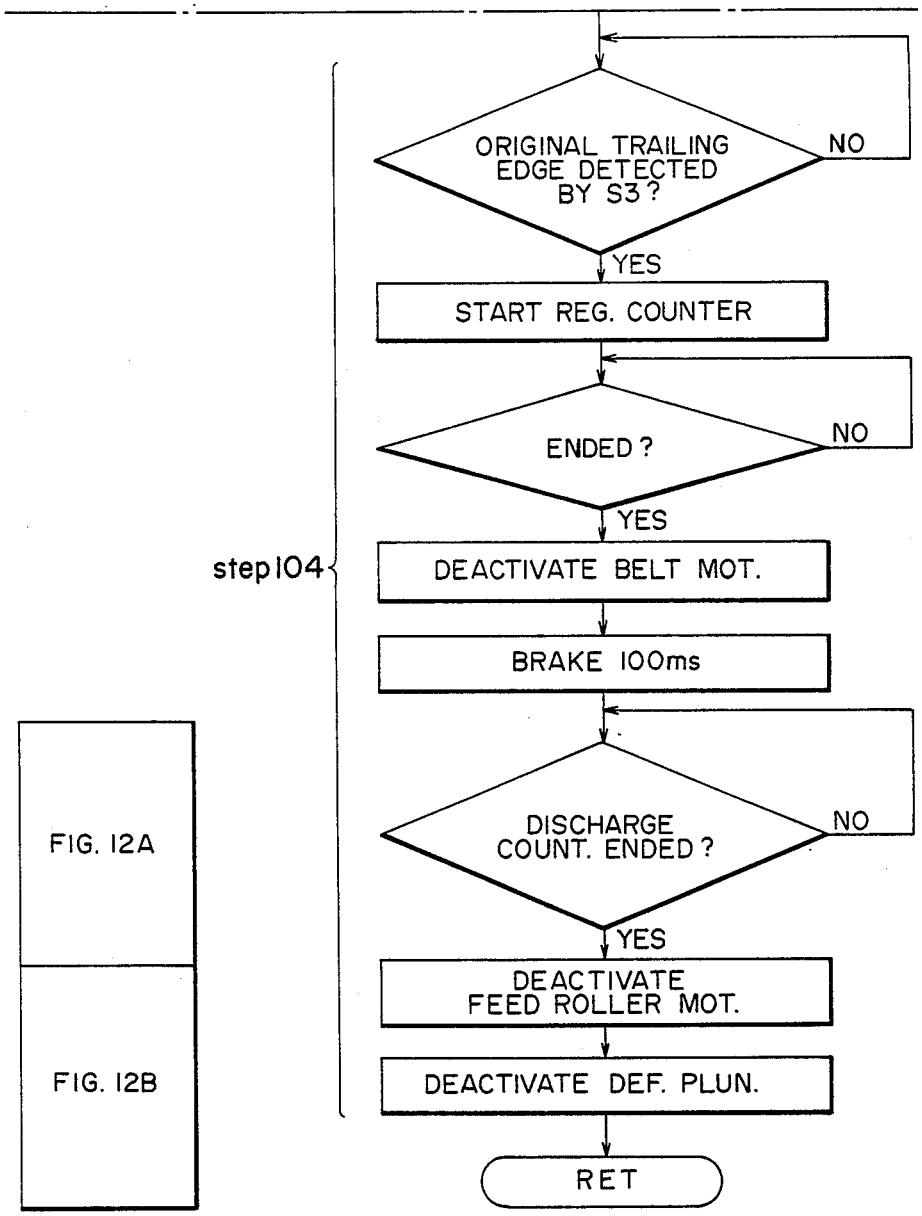
Figure 12A:
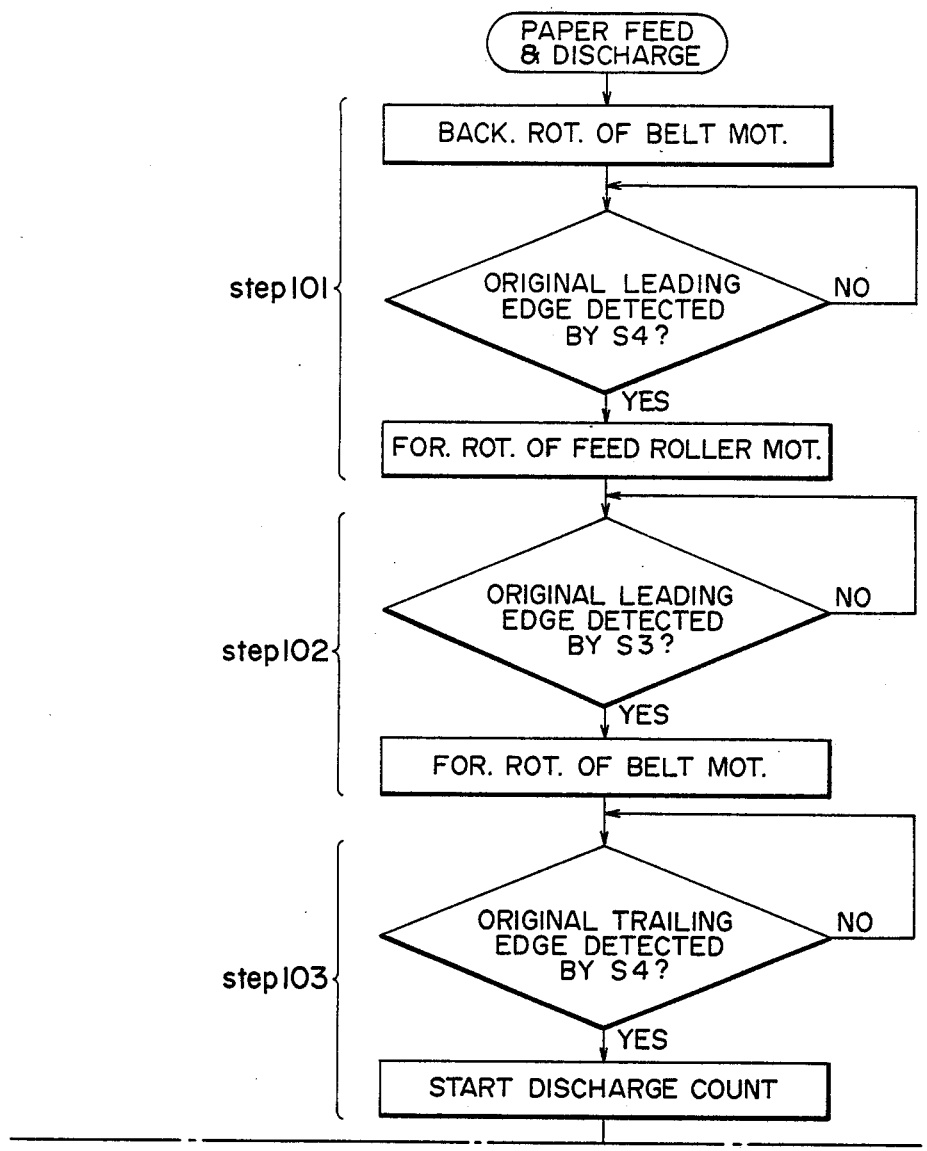

In FIG. 12, at step 101, the belt 27 rotates backwardly. Since, the movable deflector 26 now takes the chain line position, the original O6 on the platen glass 10 is conveyed back, that is, leftwardly by the backward rotation of the belt 27 in the direction shown by the arrow b, and is conveyed on the top side of the movable deflector 26 into the second sheet passageway 11. At a certain point, the leading edge of the original O6 is sensed by the fourth sheet sensor S4, whereupon the forward rotation of the couple of rollers 19 and 20 starts by the forward rotation of the feed drive motor 161.

k-1. At the time of the start of the feed drive motor 161, the leading portion of the copied original O6 is gripped by the couple of feed rollers 19 and 20, while the leading portion of the next original O5 is gripped by the couple of feed rollers 18 and 19. Therefore, the previous original O6 is conveyed along the second sheet passageway 11 to the couple of the feeding rollers 21 and 21a, while the next original O5 is conveyed along the first sheet passageway 8 to the platen glass 10.

At step 102, the leading edge of the original O5 being transported toward the platen glass 10 is detected by the third sheet sensor S3, the belt 27 is switched to the forward rotation (the direction indicated by the arrow a) by the forward rotation of the roller 27a. By the switched forward rotation of the belt 27, the force toward the platen glass 10, that is, rightward force is applied to the previous original O6 at the trailing portion thereof if it has not yet been completely removed from the belt 27. However, such a force is smaller than the transporting force applied to the original O6 by the feed rollers 19 and 20, so that the latter force prevails to retract the previous original O6 from between the belt 27 and the platen glass 10.

k-2. The previous original O6 is being conveyed along the second sheet passageway 11 by way of the couple of feed rollers 21 and 21a and the couple of feed rollers 22 and 22a to the outlet. A certain point, the trailing edge of the original O6 is detected by the fourth sheet sensor S4, whereupon an original discharge counter starts in order to discharge the original O6 back to the stacking tray 1 with the image bearing surface facing up, the same as before the feeding.

k-3. On the other hand, the next original O5 fed to the platen glass 10 surface by the forward rotation of the couple of rollers 18 and 19, enters at the lefthand end 10a of the platen glass 10 between the forwardly rotating belt 27 and the top surface of the previous original O6 which has been copied and being conveyed in the opposite direction on the platen glass 10 surface. The next original O5 is fed rightwardly by the forward rotational drive force of the belt 27, while rubbing against the previous original O6. When the trailing edge of the next original O5 is detected by the third sheet sensor S3, the registration counter 1 starts similarly to that described in Item i. When a predetermined number is counted, the belt 27 is stopped, and simultaneously, the electromagnetic brake 155 is energized for 100 ms and then deenergized. By this stopping operation, the trailing edge of the original O5 fed to the platen glass 10 is placed at the predetermined reference position O. By this time, the trailing edge of the copied original O6 being conveyed back from the platen glass 10 reaches the neighborhood of the outlet, and in response to the termination of the counting of the discharge counter, the feed drive motor 161 is deenergized, and the movable deflector plunger 30 is actuated. Thus, the feeding and discharging operation ends in FIG. 9.

As described above, the original which has been subjected to the copying operation is conveyed back from the platen glass 10 to the second sheet passageway 11 by the backward rotation of the belt 27, and is gripped by the couple of feed rollers 19 and 20, which exert the backward driving force to the original which force is larger than the forward driving force exerted by the backwardly rotating belt 27 to the next original. Additionally, the coefficient of friction between the belt 27 and the original sheet is larger than the coefficient of friction between the original sheets. For those reasons, the exchange of the original on the platen glass, that is, the discharging of the previous original and the feeding of the next original is effected smoothly and stably at all times. 1. After step 100 in FIG. 9, the sequence goes back to step 60 where the stopping signal is produced so that the forward rotation of the belt 27 is stopped. In response to this, the optical systems 346, 347a and the other processing means start operating to form a copy of the image of the bottom surface of the fifth page of the original which is rest on the platen glass face down. When the simplex copy mode has been selected, the image of the original O5 is formed on the first side of the copy sheet, and the copy sheet is discharged to the copy tray T with the image bearing side facing up, where the copy is brought on the copy of the sixth page.

Figure 13:
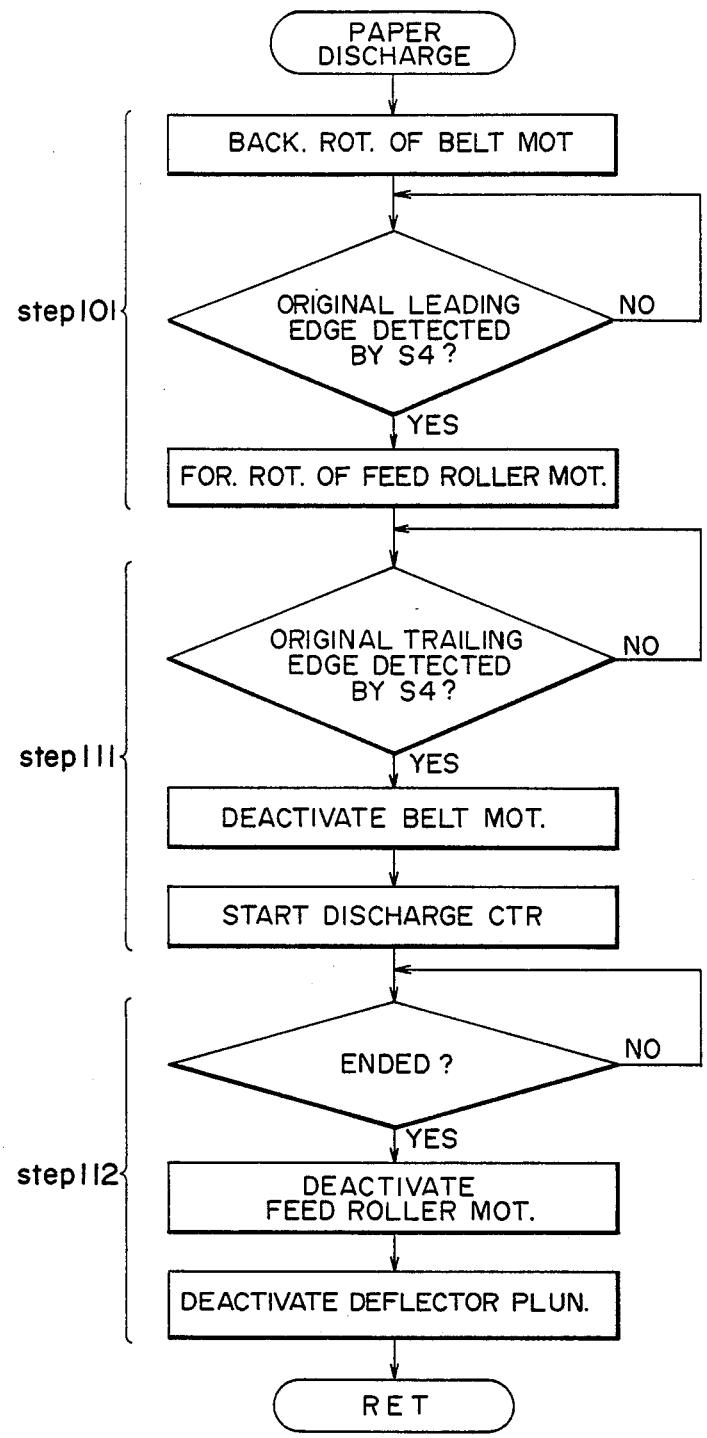

When the duplex copy mode has been selected, the previous copy sheet on which the image of the sixth page has been formed on the first side thereof is fed out of the interim tray 340. An image of the fifth page of the original is copied on the opposite side of the copy sheet to provide a double sided copy. And then the double sided copy is discharged to the copy tray T with the fifth page copy side facing up. During this, the copy sheet moves in the manner described hereinbefore.

m. Subsequently, the process steps described in the above Items k-1 to k-3 and 1 are repeated to repeat the backward transportation of the copied original; the returning of the same to the stacking tray 1; the separation and feeding of the bottommost original from the stacking tray 1; the placing of the same on the platen glass 10 and the copy forming cycle. These are repeated until the first page of the original 01 on which the partition plate 240 bears is fed out of the tray 1, whereupon the partition plate 240 falls to dangle as shown by the chain lines in FIG. 16. During the movement of the partition plate 240, it crosses the optical path of the sensor 243. By this, the completion of the original feeding operation for a first set of the copies is transmitted to the control circuit.

n. The transmission of the above-described completion is discriminated at step 70 in FIG. 9, and the sequence goes to the step 110, where the paper discharging operation shown in FIG. 13 is executed. In the discharging operation, the above-described step 101 is executed, the original is introduced in the second sheet passageway 11 and to the couple of feeding rollers 21 and 21a. Further, at step 111, the fourth sheet sensor S4 detects the trailing edge of the original at a certain point of time during the original being conveyed between the couple of rollers 22 and 22a to the outlet, whereupon the driving motor 151 for the belt 27 is stopped, and the above-described original discharge counter starts. When the counting operation completes at step 112, the original feeding roller drive is stopped, and the movable deflector plunger 30 is deenergized so that the original discharging operation ends, and the original is discharged through the outlet.

When the set number of copies N is 1, the partition plate 240 remains dangling. When it is more than 1, the stepping motor 241 is energized again after the first page of the original is returned onto the stacking tray 1. The partition plate 240, therefore, is again placed on the first page of the originals. Moreover, when the plural number of copies is set, the feeding of the bottommost original, that is, the sixth page of the originals start again at the time when the first page of the originals is conveyed back from the platen glass 10.

o. In the manner described above, the stack of the originals is automatically and continuously fed and circulated N times, with the result that on the copy tray T of the copying apparatus, N sets of the simplex or duplex copies are provided in the same page order as of the set of the originals on the original stacking tray 1.

B. DUPLEX ORIGINALS a. The description is made with respect to an exemplary case where three sheets of duplex originals 01-03 having first - sixth pages are reproduced as simplex or duplex copies, and the desired number of copies for each is N, as shown in FIG. 17.

Figures 14, 14A, 14B, 14C:
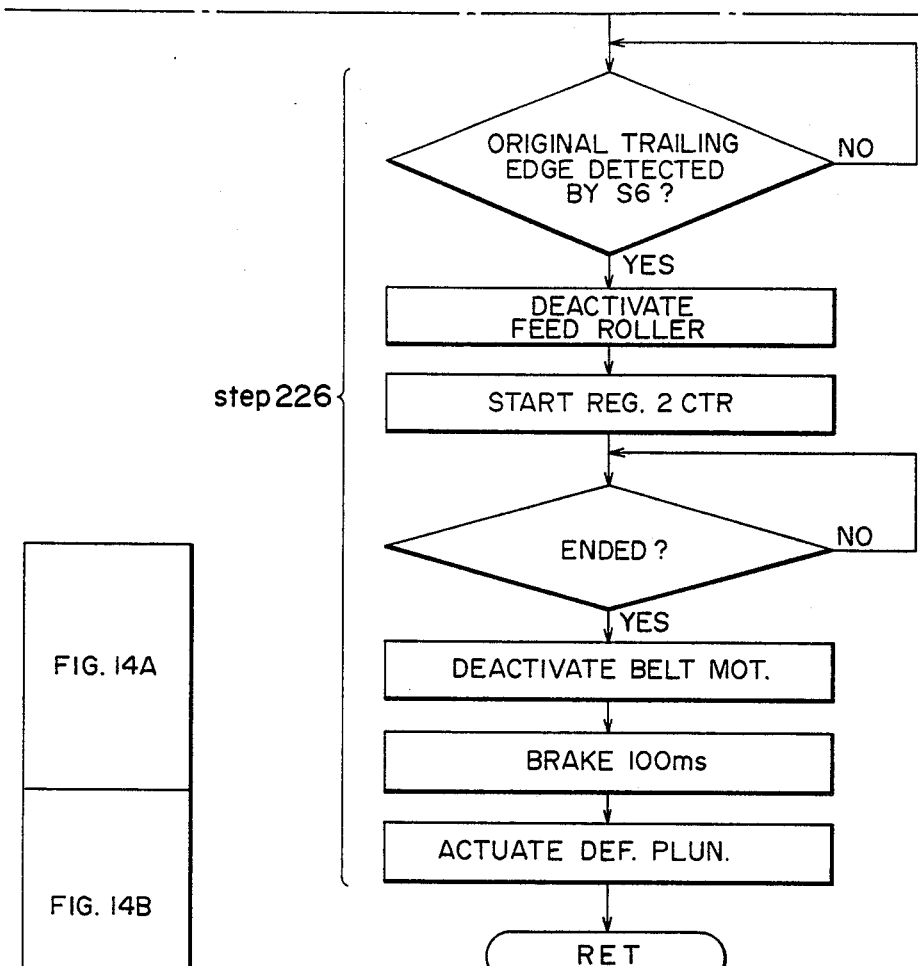
Figure 14A:
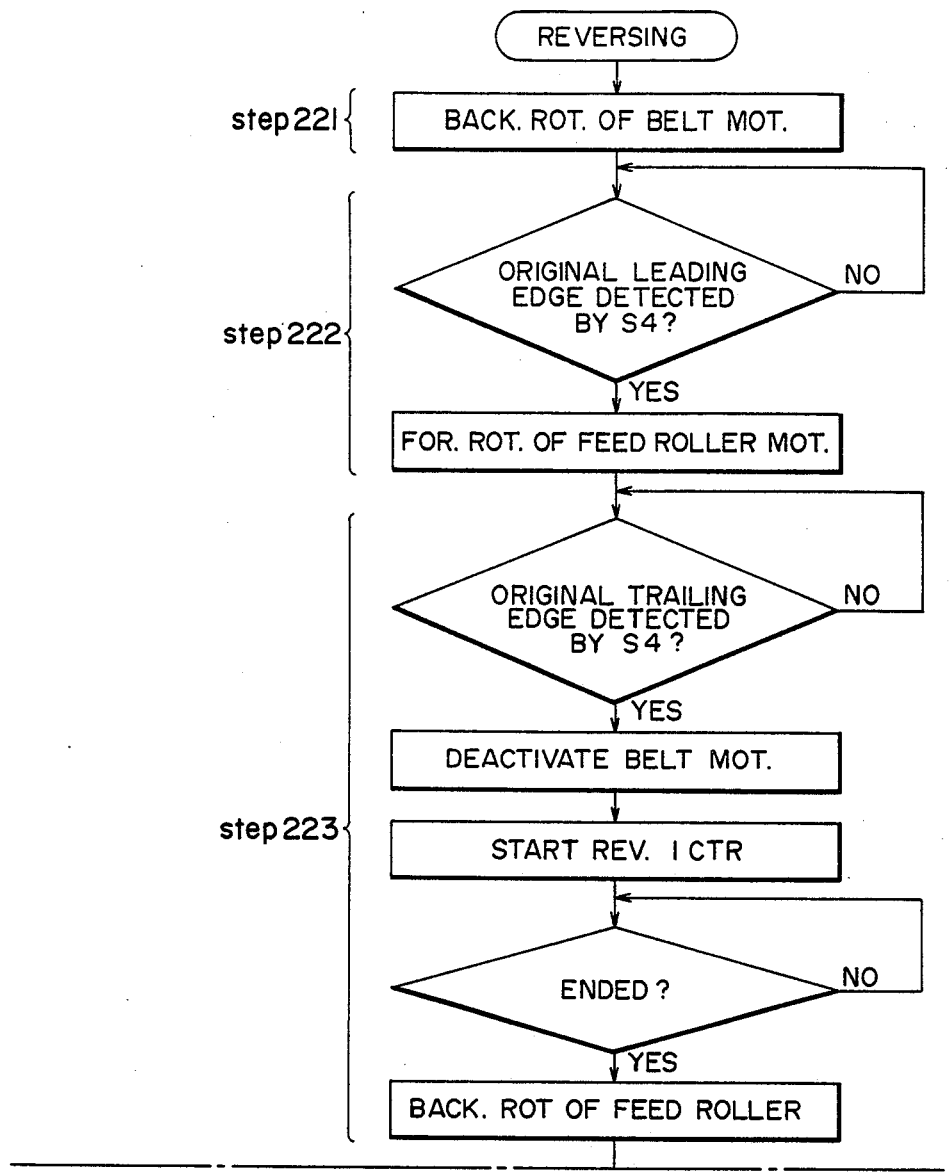
Figure 14B:
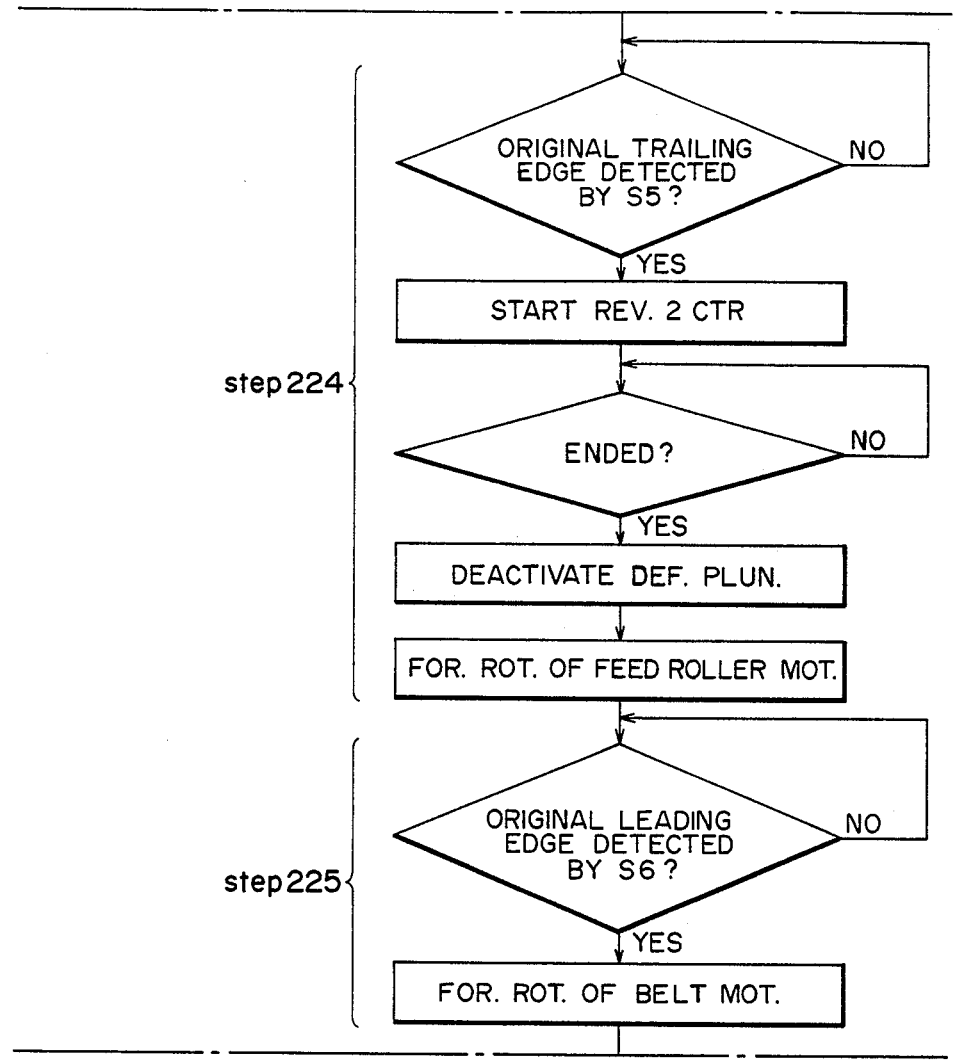

The originals 01-03 are stacked in the page order with the first page side facing up, and it is placed on the stacking tray 1 in the same manner as decribed in Item a of SIMPLEX ORIGINALS.

b. The operator sets operating panel (not shown) of the main assembly 100, the nature of the originals, that is, the duplex originals, the desired number of copies N and the copy mode, that is, simplex copy mode or duplex copy mode and other copy conditions if necessary. Then, the operator depresses the copy start button. In this case, the duplex mode is set.

c. In response to the copy start signal, at step 200 (FIG. 9) the above described separating operation is performed, and at step 210 the above-described original feeding operation is carried out. Through the steps similar to the above-described Items c-i of the SIMPLEX ORIGINALS case, the bottommost original 03 on the stacking tray 1 is fed to the platen glass 10.

d. It should be noted that the original 03 is placed on the platen glass 10 with the fifth page thereof facing down because of the inversion by the first passageway 8. Stated another way, the last but one page is first placed in the condition for being copied. Therefore, the main assembly 100 of the copying apparatus does not execute the image-wise exposure and copying process, but the sequence goes directly to the step 220 to execute the original inverting operation as shown in FIG. 14. At step 221, the belt 27 is rotated backwardly with the movable deflector 26 held in the chain line position.

e. By the backward rotation of the belt 27, the original 03 is conveyed back on the top of the movable deflector 26 into the second sheet passageway 11. During this, the fourth sheet sensor S4 detects the original at step 222, the feed drive motor is energized, and the original is conveyed through the couple of the feeding roller 19 and 20 rotating forwardly, the second sheet passageway 11, the feeding roller 21 and 21a rotating forwardly and the feeding roller 22 and 22a in the order named, to the portion 13a of the second sheet passageway.

f. Then, at step 223, the driving motor 151 for the belt 27 is stopped after the trailing edge of the original 03 is detected by the fourth sheet sensor S4. When a predetermined number is counted by an inversion counter, the rotation of the feeding rollers 21, 21a, 22 and 22a is switched for the opposite direction rotation. By the time when the inversion 1 counter counts up, the trailing edge of the original 03 is introduced into the portion 13a of the second sheet passageway and is placed before the feeding rollers 21 and 21a.

g. By the above-described reversed rotation of the couple of rollers 21 and 21a, the original 03 in the second sheet passageway 13a is switched back toward the third sheet passageway 13, and then conveyed into the portion 13b of the third sheet passageway where the couple of rollers 23 and 23a rotate forwardly, that is, in the direction to take the original.

h. Then, the trailing edge of the original 03 is detected by the fifth sensor S5 at step 224, whereafter at the time when the inversion 2 counter counts a predetermined count, the rotation of the couple of rollers 23 and 23a is switched for a reversed rotation. By the time of the counting up, the trialing edge of the original 03 is introduced into the portion 13b of the third sheet passageway and is placed before the rollers 23 and 23a. At this time, the leading edge of the original 03 is curled by the arcuated guides 15a and 15b so that the leading portion thereof is exposed outside the document feeder through the opening 15d, wherein the side of the original 03 which is about to be copied faces up. The couple of rollers 23 and 23a tempolarily stops when it is switched from the forward rotation to the backward rotation. The amount of the part of the original exposed is different depending on the size of the original. To the outside of a covering assembly 300, ribs 300a are provided to improve the sliding action of the originals which are electrically charged.

Since the original which is going to be conveyed to the platen glass 10 is exposed with its surface which is about to be copied facing up, the operator can check visually which side of the original is going to be fed to the reading station, so that the reliable operation is achieved. Additionally, the document feeder as a whole is more compact than conventional feeders having inverting mechanism.

i. By the reversed rotation of the couple of rollers 23 and 23a, the original 03 is switched back and introduced into the fourth sheet passageway 16. At this time, the movable deflector plate 26 is shifted to the solid line position so that the original 03 passes on the top of the deflector 26 toward the lefthand end 10a of the platen glass 10.

j. When the sixth sheet sensor S6 senses the leading edge of the original 03 which has been introduced into the fourth sheet passageway 16, the belt 27 starts forward rotation. With this rotation, the original 03 enters between the platen glass 10 and the forwardly rotating belt 27 via the top of the movable deflector 26 and through the clearance X between the edge of the movable deflector 26 and the surface of the belt 27. Then, the original 03 is fed rightwardly on the platen glass 10 by the conveying force exerted by the belt 27.

k. The trailing edge of the original 03 is detected by the sixth sheet sensor S6. At the time when a predetermined number of counts is counted by a registration 2 counter, the forward rotation of the belt 27 is stopped, and simultaneously, the electromagnetic brake 155 is energized for 100 ms, and the movable deflector plunger 30 is energized for the purpose of subsequent discharging of the original. At this time of this stoppage, the trailing edge of the original 03 brought onto the platen glass 10 is at a predetermined reference position 0.

l. In the manner described in the Items d–k, the original 03 is placed on the platen glass 10 with the sixth page thereof facing down. At step 230, responsive to the stop of the belt 27 (Item k), the optical systems 346 and 347a or other means of the copying machine 100 operate to produce a copy of the sixth page of the original 03 facing down. When the copy mode selected in the above Item b is the simplex copy mode, the image of the sixth page is formed on the first side of the copy sheet, and the copy sheet is discharged to the copy tray T with the image bearing side facing up. When the duplex copy mode is selected, the copy sheet is not discharged to the copy tray T, but is fed to and stored at the interim tray 340 tentatively in the re-feeding mechanism 40 of the copying apparatus.

m. In response to the completion of the exposing and copying process of the main assembly 100 with respect to the sixth page of the original 03, a copy start signal is produced. In response to the start signal, the stop signal is reset and the sequence goes to step 250, where the above-described inverting operation is again implemented. The belt 27 is switched to the reversed rotation so that the original 03 is conveyed back on the platen glass 10, that is, the leftwardly, to the second sheet passageway 11. By this time, the movable deflector 26 has been switched to the chain line position. Then, the inverting operation is effected to the original 03 in the same manner as described in the above Items e-k. Through the inverting operation, the original 03 is brought back onto the platen glass 10 with the fifth page thereof facing down. At step 260, the exposing and copying process is executed to the fifth page of the original by the main assembly 100. When the copy mode selected is the simplex copy mode, the image of the fifth page is formed on the first side of the copy sheet, and the copy sheet is discharged to the copy tray T with the image bearing side facing up. The copy sheet of this page is placed on the copy of the sixth page previously taken. When the duplex copy mode is selected, the same copy sheet as before, that is, the copy sheet having the image of the sixth page on the first side is re-fed from the interim tray 340, and the image of the fifth page of the original is formed on the second side of the copy sheet. The copy sheet is discharged to the copy tray T with the fifth image page facing up. During the exposure operation, the discrimination is made as to the final original has been fed out or not, by the partition plate sensor at step 270. In this example, the above-described separating operation is effected at step 280, so that the next original 02 is gripped by the feeding rollers.

n. After completion of the exposure process for the fifth page of the original, which is detected at step 290, the sequence proceeds to step 300 whereby the above described original feeding and discharging operation is performed by backwardly rotating the belt 27 and by switching the movable deflector 26 to the chain line position. In the same manner as described in the above Item k of SIMPLEX ORIGINALS, the original 03 is directed to the second sheet passageway 11 and is returned to the stacking tray 1 with its fifth page facing up. Parallel to the operation, the next original 02 is fed out of the stacking tray 1. The next original 02 is subjected to the above-described inverting operation which has been explained in the above Items d - n so that the fourth page and subsequently the third page are copied as simplex copies or as a duplex copy. The copy or copies are discharged to the copy tray T.

o. The above-described actions are repeated for the respective originals on the original stacking tray 1, with the result that N sets of the simplex or duplex copies are produced in the same page order as the stacked originals on the original stacking tray 1, and are placed on the copy tray T of the main assembly 100. In any case of the simplex original mode and the duplex original mode, the original which has been subjected to the exposure operation on the platen glass 10, returned to the original stacking tray 1 side and placed on the topmost original on the tray 1, is slidden on the topmost original downwardly owing to the inclination of the tray 1 by the gravity. The original then slides under the weight member 40 which is at that time held lifted so that the leading edge of the original abuts the regulating plate 44 without being interfered with the weight member 40. Stated another way, the originals sequentially returned to the original stacking tray 1 are not obstructed by the weight member 40 and re-stacked on the topmost original on the tray 1 at all times smoothly, whereby the automatic inversion of the original and the circulation thereof are stably implemented.

Since the next original is discharged of the stacking tray 1 while the previous original is being discharged from between the platen glass 10 and the belt 27, the on-coming original and out-going original pass each other (Item k of the simplex original case, Item n of the duplex original case), whereby the time required for feeding an discharging the originals for each of the copying cycles is minimized to increase the overall copying speed.

The foregoing description has been made with respect to a automatic document feeder according to an embodiment of the present invention applied to an electrophotographic copying machine of a duplex copy type. However, the present invention is not limited to such an embodiment. For example, the automatic document feeder according to this embodiment work effectively when used with a simlex type copying machine. Additionally, the automatic document feeder according to this invention is applicable not only to a copying apparatus but to a laser beam printer or an ink jet printer or the other types of image recording apparatus. In the embodiment described above, the copying apparatus has been used. Consequently, the original reading station includes a platen glass for supporting and illuminating the original, but this is not limiting. For example, if the present invention is used with a facsimile machine, the original reading station may includes an image pickup device and means for transmitting a light image to the image pickup device. As for the original, it is not limited to paper, but a plastic sheet or the like is usable. The other materials may be used if they have a thickness suitable for conveyance with the use of a known conveying means having rollers, belts or air pressure.

According to the embodiment described above, the automatic document feeder is operable with minimum jamming of the original or damage thereto.

Figure 18A:
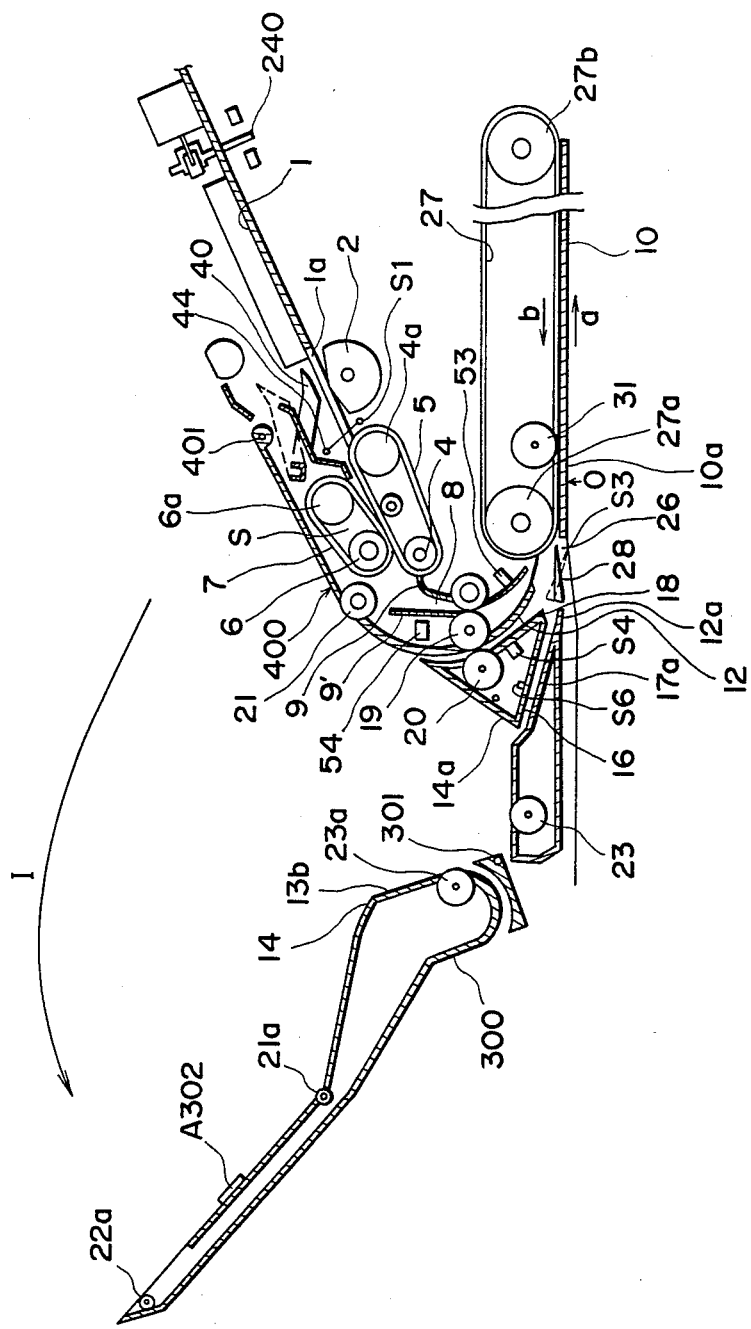
FIGS. 18A, 18B and 18C illustrate the opening end closing of a guide.
Figure 18B:
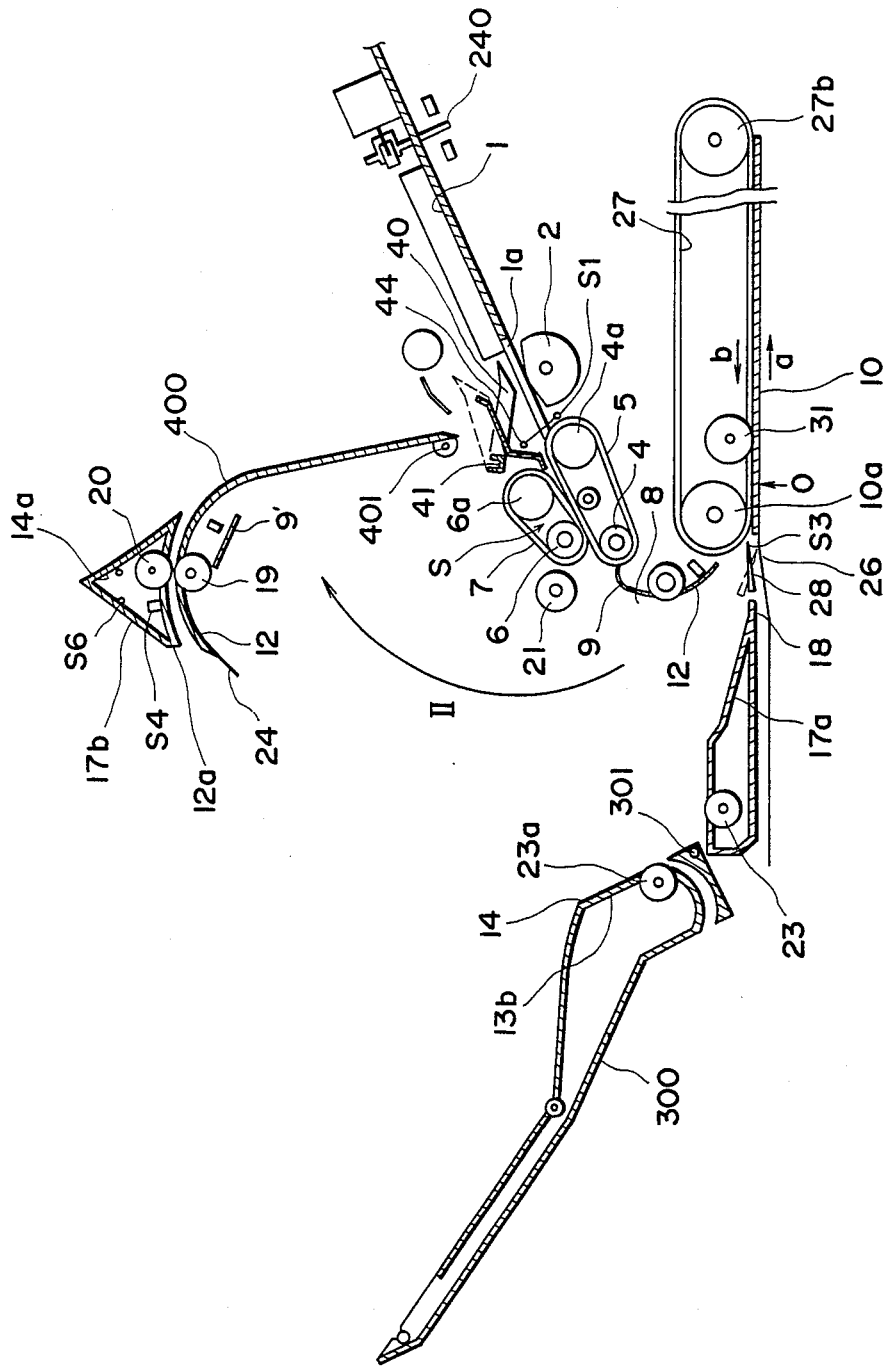
Figure 18C:
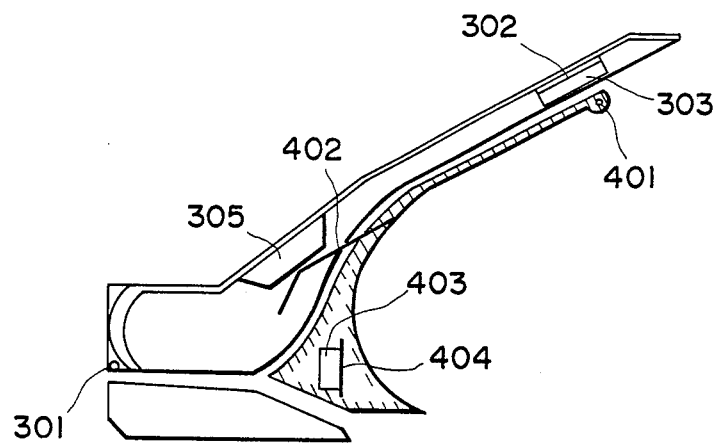

FIGS. 18A, 18B and 18C illustrate the opening of the sheet passageways.

The openable covering assembly 300 is rotatably mounted about a shaft 301 fixedly secured to side plates (not shown). The feeding rollers 21a, 22a and 23a are mounted with springs or the like to the covering assembly 300 as shown. The covering assembly 300 is provided with a fastening member A302 at such a position that does not interfere with the original passageway. At a corresponding position of the side plate, a member is provided which is engageable with the fastening member A302 so that the covering assembly 300 is locked when the covering is closed by those members. The locking mechanism may be of a magnet catch type or a Delrin catch type.

A guiding assembly 400 as best seen in FIG. 18B is rotatably mounted to a shaft 401 which is securedly fixed to the side plates (not shown). The guiding assembly 400 includes the above-described feeding rollers 19 and 20. As shown in FIG. 18C, the guiding assembly 400 is provided with a leaf spring 402 at a position so as not to interfere with the original passageway and also is provided with a projection 403. When the above-described covering assembly 300 is closed, the leaf spring 402 is pushed by a spring receiving portion 305 which is provided in said covering assembly 300 at such a position corresponding to the leaf spring 402. The spring reaction when the covering member 300 is closed, is effective to urge the guiding assembly 400 to its closing position. When this closing force is applied in the counterclockwise direction in the FIGURES, the projection 403 of the guiding assembly engages to a stopper 404 which is fixed to the side plate, so that the guiding assembly 400 is positioned in place. When the covering assembly 300 is rotated in the direction indicated by a reference I to open it, the sheet passageways 13a, 13 and 13b are opened so as to allow the access to those passageways, so that the original jammed there, if any, can be removed.

Further, the guiding assembly 400 can be rotated in the direction II to open it. The sheet passageways 16 and 8 are opened so as to allow access thereto.

If the original is jammed in the sheet passageway 11 and if a part of the original is between the belt 27 and the platen glass 10, the guiding assembly 400 is rotated away from the belt 27 and the platen glass 10 in order to open it, whereby the original may be removed without damage.

The opening of the separator-feeder mechanism will be described.

Figure 19A:
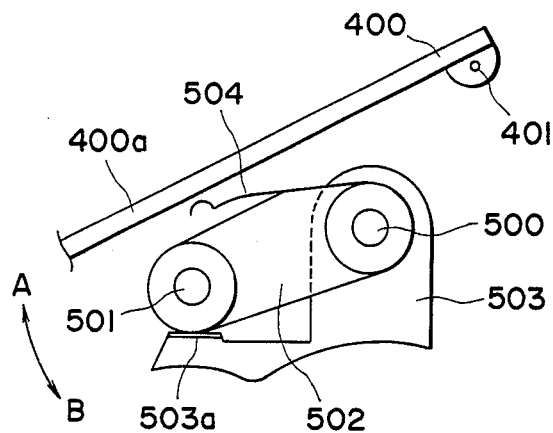
FIGS. 19A and 19B illustrate the opening of the separating mechanism.
Figure 19B:
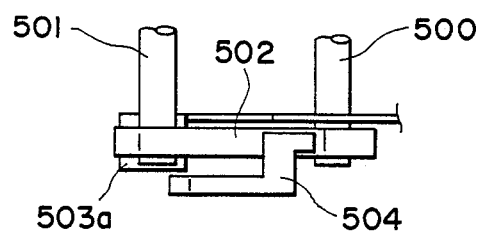

As shown in FIGS. 19 and 19B, a driving shaft 500 for driving the separating roller 6a is rotatably mounted to separator side walls 503, and a holder 502 is rotatably mounted to the shaft 500. To the holder 502, a driven shaft 501 for supporting the separating roller 6 is rotatably mounted, and also a leaf spring 504 is mounted.

When the covering assembly 400 is closed the guiding assembly 400 is also fixed at a predetermined position. At this time, a portion 400a of the guiding assembly 400 pushes the leaf spring 504 so as to rotate the entire holder 502 about the shaft 500 in the direction indicated by an arrow B. By this, a part of the holder 502 is engaged to a stopper 503a fixed to the separator side plate 503 so that the separating rollers 6 and 6a and separating belt 7 are positioned in place.

When the covering assembly 300 is rotated in the direction I, and the guiding assembly 400 is rotated in the direction II the leaf spring 504 becomes free so that the force for rotating the holder 502 about the shaft 500 in the direction B is not present, with the result that the separating roller 6 and the separating belt 7 is rotatable about the shaft 500 in the direction indicated by an arrow A. This releases the pressure in the separating station.

As described above, according to this embodiment of the present invention, when the covering assembly is opened, the associated part of the passageways is opened, and when the guiding assembly is opened, the associated part of the passageways are opened. Therefore, the original, if jammed, can be removed without difficulty. Further, even if the original is jammed in the passageway in the guiding assembly and if the part of the original is between the belt 27 and the platen glass 10, the direction of rotation of the guiding assembly when it is opened is such that the original is retracted from between the belt 27 and the platen glass 10 so that the removal of the original is easy. Also, since the openings of the passageways are interrelated with the pressure releasing of the separator-feeder mechanism, the original jammed in the separator-feeder mechanism is also easily removed. As described above, the present invention is capable of providing an automatic original feeder which is easy to handle.

As described in detail hereinbefore, the automatic document feeder according to the embodiment of the present invention includes the first sheet passageway 8, the second sheet passageway 11, the portion 13a of the second sheet passageway, the third sheet passageway 13 and 13b, the fourth sheet passageway 15 and the fifth sheet passageway 16 which correspond to the first original passage, the second original passage, the third original passage, the fourth original passage, the fifth original passage and the sixth original passage of the present invention, respectively.

While the invention has been described with reference to the structures disclosed herein, it is not confined to the details set forth and this application is intended to cover such modifications or changes as may come within the purposes of the improvements or the scope of the following claims.

What is claimed is:

1. An automatic feeder for feeding an original to be read to a station for reading the horiginal, comprising:
   an original supporting station for supporting an original to be read;
   a first original passage, which is a unidirectional passage for inverting the face-orientation of and directing the original from said original supporting station to a vicinity of an end of the original reading station;
   a second original passage, which is a unidirectional passage, for receiving the original from the vicinity of the end ofthe original reading station;
   a third original passage, which is a switching-back passage, for receiving the original from said second passage and for switching it back, said third passage being cooperative with said second passasge to invert and discharge the original;
   a fourth original passage, which is a unidirectional passage, for receiving the original from said third passage after the original is switched back by said third passage;
   a fifth original passage, which is a switching-back passage, for receiving the original from said fourth passage and for switching it back; and
   a sixth original passage, which is a unidirectional passage, for receiving the original from said fifth passage after the original is switched back by said fifth passasge and directs the original to the vicinity of the end of the reading station.

2. A feeder according to claim 1, wherein said first passage is arcuated to feed the original to the original reading station with inversion of the original.

3. A feeder according to claim 1, wherein said second original passage is arcuated outside the arcuation of said first original passage to convey the original to said third original passage with inversion of the original and is merged streamlined to said third original passage for allowing conveyance of the original from said second original passage to said third original passage.

4. A feeder according to claim 1, wherein said third, fourth and fifth original passages are streamlined with respect to each other.

5. A feeder according to claim 1, wherein said second, fourth and sixth original passages constitute substantially a triangle.

6. A feeder according to claim 1, further comprising separating and feeding means, between said original supporting station and said first original passage, for singling out the original from said supplying station.

7. A feeder according to claim 6, wherein said third original passage is substantially above said separating and feeding means.

8. A feeder according to claim 7, wherein said third original passage is provided with a couple of rollers for discharging the original to the supplying station.

9. A feeder according to claim 1, wherein said third original passage is provided with a couple of reversible rollers for receiving the original from said second original passage and switching it back to said fourth original passage.

10. A feeder according to claim 1, wherein said fifth original passage is provided with a couple of reversible rollers for receiving the original from said fourth original passage and switching it back to said sixth original passage.

11. A feeder according to claim 10, wherein said fifth passage is arcuated and open at one end thereof to expose substantially faceup such a side of the original which is going to be read by the reading station, when said fifth original passage receives the original and before it conveys the original to the reading station through said sixth original passage.

12. A feeder according to claim 1, wherein said first original passage is provided with a couple of rollers for unidirectional feeding of the original.

13. A feeder according to claim 1, wherein said second original passage is provided with a couple of rollers for unidirectional conveyance of the original.

14. A feeder according to claim 13, wherein the reading station is provided with a platen glass for supporting the original and a belt slidingly contacted thereto for conveying the original to a reading position on the platen glass, wherein said couple of rollers in said second original passage exerts a stronger original conveying force than that exerted by said belt so as to allow the original to be discharged from the reading station by the rollers of said second original passage and a next original to be simultaneously fed to the reading position.

15. A feeder according to claim 1, wherein said first original passage is provided with a couple of rollers for unidirectional feeding of the original, wherein said second original passage is provided with a couple of rollers for unidirectional conveyance of the original, and wherein one of the rollers of said first original passage is common to one of the rollers of said second original passage.

16. A feeder according to claim 1, which is capable of producing a simplex record from a simplex original wherein the original is supported faceup on said supporting station; is fed with inversion thereof through said first original passage to the reading station where a record of an image of the original is formed on one side of a recording sheet; and is discharged to said original supporting station with inversion thereof through said second and third original passages.

17. A feeder according to claim 16, wherein a plurality of such originals are stacked faceup on said supporting station, and the originals are successively fed from the bottom to the reading station through said first original passage.

18. A feeder according to claim 1, which is capable of producing a duplex record from simplex originals, wherein the originals are supported faceup on said supporting station in a page order thereof from the top; a bottommost original is fed with the inversion thereof through said first original passage to the reading station where a record of an image of the original is formed on one side of a recording sheet; is discharged toward the original supporting station with the inversion thereof through said second and third original passages; the then bottommost original is fed with the inversion thereof through said first original passage to the reading station where a record of an image of the second original is formed on the opposite side of the same recording sheet; and is discharged toward the original supporting station with the inversion thereof through said second and third original passages.

19. A feeder according to claim 18, wherein a plurality of such originals are stacked faceup on said supporting station, and the originals are successively fed from the bottom to the reading station through said first original passage.

20. A feeder according to claim 1 which is capable of producing simplex records from a duplex original, wherein the original is supported on said supporting station with its bottom page facing down; the original is fed with the inversion thereof through said first original passage to the reading station where no image recording operation is effected; is conveyed with the inversion thereof to said third original passage through said second original passage; is switched back and conveyed to said fifth original passage through said fourth original passage; is switched back and conveyed through said sixth original passage to the reading station where a record of an image of the bottom page of the original is formed on one side of a recording sheet; is conveyed with the inversion thereof to said third original passage through said second original passage; is switched back and is conveyed to said fifth original passage through said fourth original passage; is switched back and is conveyed through said sixth original passage to the reading station where a record of an image of a front page of the original is formed on the opposite side of the same recording sheet; and is discharged toward the original supporting station with the inversion thereof through said second and third original passages.

21. A feeder according to claim 20, wherein a plurality of such duplex originals are stacked on said supporting station in their page order from the top, and the originals are fed from the bottom to the reading station through said first original passage.

22. A feeder according to claim 1 which is capable of producing a duplex record from a duplex original, wherein the original is supported on said supporting station with its bottom page facing downwardly; the original is fed with the inversion thereof through said first original passage to the recording station where no image recording operation is affected; is conveyed with the inversion thereof to said third original passage through said second original passage; is switched back and conveyed to said fifth original passage through said fourth original passage; is switched back and conveyed through said sixth original passage to the reading station where a record of an image of the bottom page of the original is formed on one side of a recording sheet; is conveyed with the inversion thereof to said third original passage through said second original passage; is switched back and is conveyed to said fifth original passage through said fourth original passage; is switched back and conveyed through said sixth passage to the reading station where a record of an image of a front page of the original is formed on the opposite side of the same recording sheet; and is discharged toward the original supporting station with the inversion thereof through said second and third original passages.

23. A feeder according to claim 22, wherein a plurality of such duplex originals are stacked on said supporting station in their page order from the top, and the originals are fed from the bottom to the reading station through said first original passage.

24. A feeder according to claim 1, further comprising a convering assembly containing said fifth original passage asnd constituting one side of each of said third and fourth original passages, said covering assembly is rotatable away from said third and fourth original passages to open said third and fourth original passages.

25. An apparatus according to claim 24, further comprising a guiding assembly containing said second original passage and constituting one side of each of said first, third, fourth and sixth original passages, said guiding assembly is rotatable away from said first original passage to open said first original passage, wherein said covering assembly and said guiding assembly are so interlocked that said guiding assembly can be rotated only when said covering is opened.

26. An image forming apparatus, comprising:
means for forming an image of an original; and
an automatic feeder for feeding the original to be read to a station for reading the original, said automatic feeder including:
an original supporting station for supporting an original to be read;
a first original passage, which is a unidirectional passage, for inverting the face-orientation of and directing the original from said original supporting station to a vicinity of an end of the original reading station;
a second passage, which is a unidirectional passage, for receeving the original from the vicinity of the end of the original reading station;
a third originasl passsage, which is a switching back passage, for receiving the original from said second passage and for swtiching it back, said third passage being cooperative with said second passage to invert and discharge the original through an original outlet directly communicated with said third passage;
a fourth original passage, which is a unidirectional passasge, for receiving the original from said third passage after the originasl is switched back by said third passage;
a fifth original passage which is a switching-back passage, for receiving the original from said fourth passage and for switching it back; and
a sixth original passage which is a unidirectional passage, for receiving the original from said fifth passasge after the original is switched back by said fifth passage and feeding the original to the vicinity of the end of the reading station.

* * * * *

UNITED STATES PATENT AND TRADEMARK OFFICE
CERTIFICATE OF CORRECTION

PATENT NO. : 4,761,001
DATED : August 2, 1988
INVENTOR(S) : KIMIAKI HAYAKAWA, ET AL.    Page 1 of 5

It is certified that error appears in the above-identified patent and that said Letters Patent is hereby corrected as shown below:

SHEET 11 OF DRAWING

Figure 11:
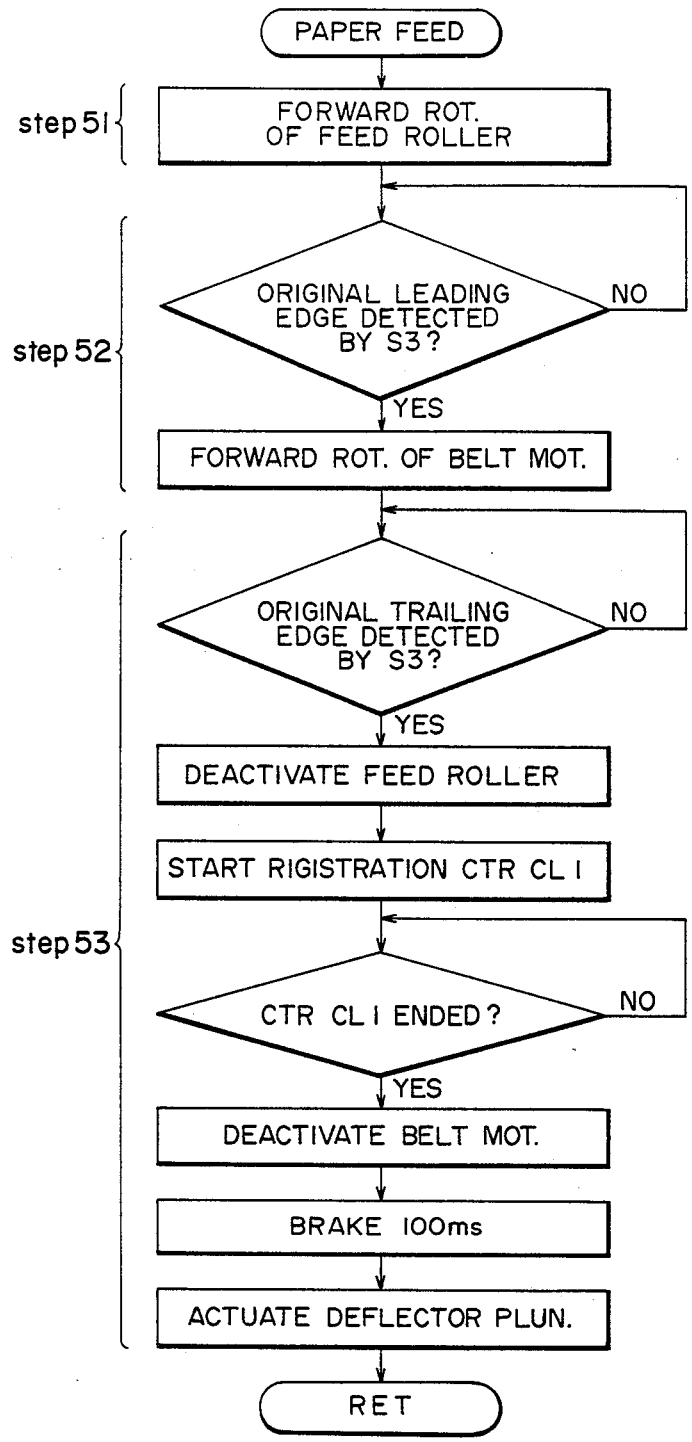

FIG. 11, "RIGISTRATION" should read --REGISTRATION--.

COLUMN 2

Line 39, "end" should read --and--.

COLUMN 3

Line 4, "only" should read --only on--.
    Line 18, "operaton" should read --operation--.

COLUMN 5

Line 64, "cooperate" should read --cooperates--.
    Line 66, "fifth passageway 15" should read --fifth passageway 16--.

COLUMN 6

Line 60, "paten 10," should read --platen 10,--.

COLUMN 9

Line 66, "with" should read --when--.

UNITED STATES PATENT AND TRADEMARK OFFICE
CERTIFICATE OF CORRECTION

PATENT NO. : 4,761,001

DATED : August 2, 1988

INVENTOR(S) : KIMIAKI HAYAKAWA, ET AL.          Page 2 of 5

It is certified that error appears in the above-identified patent and that said Letters Patent is hereby corrected as shown below:

COLUMN 10

Line 32, "mechanisms" should read --mechanism S--.
    Line 56, "original 10" should read --original O6--.

COLUMN 11

Line 3, "S2." should read --S3.--.
    Line 26, "discharged," should read --discharged, and--.
    Line 32, "orignal O5" should read --original O5--.

COLUMN 12

Line 12, "A" should read --At a--.
    Line 57, "1." should begin a new paragraph ¶.
    Line 63, "rest" should read --resting--.

COLUMN 13

Line 50, "start" should read --starts--.

COLUMN 14

Line 34, "roller" should read --rollers--.
    Line 35, "roller" should read --rollers--.
    Line 36, "roller" should read --rollers--.
    Line 61, "trialing" should read --trailing--.

UNITED STATES PATENT AND TRADEMARK OFFICE
CERTIFICATE OF CORRECTION

PATENT NO. : 4,761,001
DATED : August 2, 1988
INVENTOR(S) : KIMIAKI HAYAKAWA, ET AL.   Page 3 of 5

It is certified that error appears in the above-identified patent and that said Letters Patent is hereby corrected as shown below:

COLUMN 15

Line 1, "tempolarily" should read --temporarily--.
    Line 67, "the" (first occurrence) should be deleted.

COLUMN 16

Line 21, "to" should read --to whether--.
    Line 59, "with" should read --with by--.
    Line 66, "discharged of" should read --discharged from--.

COLUMN 17

Line 4, "an" should read --and--.
    Line 8, "a" should read --an--.
    Line 13, "work" should read --works--.
    Line 14, "simlex" should read --simplex--.
    Line 24, "includes" should read --include--.

COLUMN 18

Line 22, "closed" should read --closed,--.
    Line 29, "plate" should read --wall--.
    Line 33, "direction II" should read --direction II,--.
    Line 36, "is" should read --are-.

UNITED STATES PATENT AND TRADEMARK OFFICE
CERTIFICATE OF CORRECTION

PATENT NO. : 4,761,001
DATED : August 2, 1988
INVENTOR(S) : KIMIAKI HAYAKAWA, ET AL.  Page 4 of 5

It is certified that error appears in the above-identified patent and that said Letters Patent is hereby corrected as shown below:

COLUMN 19

Line 11, "horiginal," should read --original,--.
    Line 21, "ofthe" should read --of the--.
    Line 25, "passasge" should read --passage--.
    Line 37, "passasge" should read --passage-- and "directs" should read --directing--.

COLUMN 21

Line 43, "affected;" should read --effected;--.

COLUMN 22

Line 9, "convering" should read --covering--.
    Line 10, "asnd" should read --and--.
    Line 14, "An apparatus" should read --A feeder--.
    Line 22, "covering" should read --covering assembly--.
    Line 35, "second passage," should read --second original passage,--.
    Line 36, "receoving" should read --receiving--.
    Line 38, "originasl" should read --original-- and "switching back" should read --switching-back--.

UNITED STATES PATENT AND TRADEMARK OFFICE
CERTIFICATE OF CORRECTION

PATENT NO. : 4,761,001
DATED : August 2, 1988
INVENTOR(S) : KIMIAKI HAYAKAWA, ET-AL.  Page 5 of 5

It is certified that error appears in the above-identified patent and that said Letters Patent is hereby corrected as shown below:

COLUMN 22

```
Line 40, "swtiching" should read --switching--.
Line 47, "passasge," should read --passage,--.
Line 48, "originasl" should read --original--.
Lines 54-55, "passasge" should read --passage--.
```

Signed and Sealed this

Tenth Day of April, 1990

Attest:

HARRY F. MANBECK, JR.

*Attesting Officer*   Commissioner of Patents and Trademarks